United States Patent
Min et al.

(10) Patent No.: US 12,216,325 B2
(45) Date of Patent: Feb. 4, 2025

(54) VOICE COIL MOTOR

(71) Applicant: LG INNOTEK CO., LTD., Seoul (KR)

(72) Inventors: Sangjun Min, Seoul (KR); Sanghee Lee, Seoul (KR); Hyuneo Yoo, Seoul (KR); Seungki Kim, Seoul (KR); Jinsuk Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/598,489

(22) Filed: Mar. 7, 2024

(65) Prior Publication Data

US 2024/0210651 A1 Jun. 27, 2024

Related U.S. Application Data

(63) Continuation of application No. 18/058,304, filed on Nov. 23, 2022, now Pat. No. 11,953,753, which is a
(Continued)

(30) Foreign Application Priority Data

Jul. 12, 2010 (KR) .................. 10-2010-0067051
Jul. 23, 2010 (KR) .................. 10-2010-0071326
(Continued)

(51) Int. Cl.
*G02B 7/04* (2021.01)
*G02B 7/02* (2021.01)
(Continued)

(52) U.S. Cl.
CPC ............. *G02B 7/04* (2013.01); *G02B 7/02* (2013.01); *G03B 3/10* (2013.01); *G03B 13/34* (2013.01);
(Continued)

(58) Field of Classification Search
CPC ... G02B 7/04; G02B 7/02; G03B 3/10; G03B 13/34; H02K 41/031; H02K 41/0354; H02K 41/0356; H02K 41/03; G11B 7/00
(Continued)

(56) References Cited

U.S. PATENT DOCUMENTS 7,590,341 B2  9/2009  Iijima et al.
7,663,818 B2  2/2010  Chung
(Continued)

FOREIGN PATENT DOCUMENTS

CN  2874103 Y  2/2007
CN  1952719 A  4/2007
(Continued)

OTHER PUBLICATIONS

U.S. Appl. No. 18/058,304, filed Nov. 23, 2022.
(Continued)

*Primary Examiner* — William R Alexander
(74) *Attorney, Agent, or Firm* — SALIWANCHIK, LLOYD & EISENSCHENK

(57) ABSTRACT

A VCM (voice coil motor) is disclosed, the VCM including: a rotor including a cylindrical bobbin for accommodating a lens and protruded at a bottom end with a boss, and a coil block arranged at a periphery of the bobbin; a stator including a magnet facing the coil block and a yoke fixing the magnet; and an elastic member including a first elastic member formed with a through hole coupled to the boss of the bobbin and a second elastic member coupled to an upper end facing the bottom end of the bobbin; wherein the boss is formed with a disengagement prevention unit inhibiting the first elastic member from being disengaged from the boss, and the first elastic member is formed with a coupling unit contacting a joint where the disengagement prevention unit and the coupling unit meet.

20 Claims, 19 Drawing Sheets

Related U.S. Application Data continuation of application No. 16/911,037, filed on Jun. 24, 2020, now Pat. No. 11,536,928, which is a continuation of application No. 16/109,076, filed on Aug. 22, 2018, now Pat. No. 10,739,550, which is a continuation of application No. 15/597,913, filed on May 17, 2017, now Pat. No. 10,082,637, which is a continuation of application No. 15/010,680, filed on Jan. 29, 2016, now Pat. No. 9,658,425, which is a continuation of application No. 14/333,297, filed on Jul. 16, 2014, now Pat. No. 9,250,415, which is a continuation of application No. 13/180,869, filed on Jul. 12, 2011, now Pat. No. 8,810,936.

(30) Foreign Application Priority Data

| | | |
|---|---|---|
| Jul. 23, 2010 | (KR) | 10-2010-0071635 |
| Oct. 21, 2010 | (KR) | 10-2010-0102737 |

(51) Int. Cl.
| | |
|---|---|
| G03B 3/10 | (2021.01) |
| G03B 13/34 | (2021.01) |
| H02K 41/03 | (2006.01) |
| H02K 41/035 | (2006.01) |
| G11B 7/00 | (2006.01) |

(52) U.S. Cl.
CPC ....... *H02K 41/031* (2013.01); *H02K 41/0354* (2013.01); *H02K 41/0356* (2013.01); *G11B 7/00* (2013.01); *H02K 41/03* (2013.01)

(58) Field of Classification Search
USPC .................. 310/12.16; 359/822, 823, 824
See application file for complete search history.

(56) References Cited

U.S. PATENT DOCUMENTS

| | | | |
|---|---|---|---|
| 7,663,823 | B2 | 2/2010 | Chung |
| 7,675,565 | B2 | 3/2010 | Cheng |
| 7,706,088 | B2 | 4/2010 | Chung |
| 7,826,157 | B2 | 11/2010 | Chen et al. |
| 8,355,075 | B2 | 1/2013 | Shiraishi |
| 8,368,255 | B2 | 2/2013 | Park et al. |
| 8,503,119 | B2 | 8/2013 | Sato et al. |
| 8,503,121 | B2 | 8/2013 | Osaka et al. |
| 8,531,789 | B2 | 9/2013 | Osaka et al. |
| 8,630,048 | B2 | 1/2014 | Min et al. |
| 8,638,510 | B2 * | 1/2014 | Lee ................ H02K 41/035 359/814 |
| 8,836,177 | B2 | 9/2014 | Lee et al. |
| 8,912,690 | B2 | 12/2014 | Kim et al. |
| 8,929,005 | B2 | 1/2015 | Park et al. |
| 9,046,640 | B2 | 6/2015 | Min et al. |
| 9,190,891 | B2 | 11/2015 | Lee et al. |
| 9,658,425 | B2 | 5/2017 | Min et al. |
| 10,048,569 | B2 | 8/2018 | Lee et al. |
| 2007/0053082 | A1 | 3/2007 | Sue et al. |
| 2007/0110424 | A1 | 5/2007 | Iijima et al. |
| 2007/0159550 | A1 | 7/2007 | Cheng |
| 2008/0158412 | A1 | 7/2008 | Tagome et al. |
| 2009/0051774 | A1 | 2/2009 | Shiraishi |
| 2010/0128372 | A1 | 5/2010 | Wang |
| 2012/0008220 | A1* | 1/2012 | Lee ................ H02K 41/035 359/822 |
| 2012/0013202 | A1* | 1/2012 | Lee ................ H02K 41/0356 310/12.16 |
| 2012/0025633 | A1* | 2/2012 | Lee ................ H02K 41/035 310/12.16 |
| 2012/0200176 | A1* | 8/2012 | Park ................ H04N 23/55 310/12.16 |
| 2013/0135762 | A1* | 5/2013 | Lee ................ G02B 7/04 359/824 |
| 2014/0347556 | A1* | 11/2014 | Lee ................ H02K 41/0356 348/373 |
| 2018/0039157 | A1 | 2/2018 | Lee et al. |
| 2019/0369463 | A1* | 12/2019 | Park ................ H02K 41/0356 |

FOREIGN PATENT DOCUMENTS

| | | |
|---|---|---|
| CN | 101068091 A | 11/2007 |
| CN | 101178470 A | 5/2008 |
| CN | 101520538 A | 9/2009 |
| CN | 101527490 A | 9/2009 |
| CN | 101592771 A | 12/2009 |
| CN | 101750691 A | 6/2010 |
| JP | 2007-108598 A | 4/2007 |
| JP | 2008-58946 A | 3/2008 |
| JP | 2009-080217 A | 4/2009 |
| JP | 2009-139941 A | 6/2009 |
| JP | 2009-210055 A | 9/2009 |
| KR | 10-0490253 B1 | 5/2005 |
| KR | 10-2007-0109547 A | 11/2007 |
| KR | 10-2008-0068774 A | 7/2008 |
| KR | 10-2008-0075785 A | 8/2008 |
| KR | 10-2008-0076814 A | 8/2008 |
| KR | 10-2008-0082845 A | 9/2008 |
| KR | 10-2008-0099567 A | 11/2008 |
| KR | 2009-0026480 A | 3/2009 |
| KR | 10-2010-0046452 A | 5/2010 |
| KR | 10-2011-0029346 A | 3/2011 |

OTHER PUBLICATIONS

U.S. Appl. No. 16/911,037, filed Jun. 24, 2020, now U.S. Pat. No. 11,536,928, issued Dec. 27, 2022.
U.S. Appl. No. 16/109,076, filed Aug. 22, 2018, now U.S. Pat. No. 10,739,550, issued Aug. 11, 2020.
U.S. Appl. No. 15/597,913, filed May 17, 2017, now U.S. Pat. No. 10,082,637, issued Sep. 25, 2018.
U.S. Appl. No. 15/010,680, filed Jan. 29, 2016, now U.S. Pat. No. 9,658,425, issued May 23, 2017.
U.S. Appl. No. 14/333,297, filed Jul. 16, 2014, now U.S. Pat. No. 9,250,415, issued Feb. 2, 2016.
U.S. Appl. No. 13/180,869, filed Jul. 12, 2011, now U.S. Pat. No. 8,810,936, issued Aug. 19, 2014.
Office Action dated Dec. 18, 2014 in Chinese Application No. 201110195036.6.
Office Action dated Jul. 15, 2015 in Chinese Application No. 201110195036.6.
Office Action dated Mar. 18, 2015 in U.S. Appl. No. 14/333,297.
Office Action dated Jul. 11, 2016 in Korean Application No. 1020100067051.
Office Action dated Aug. 12, 2016 in Korean Application No. 1020100071326.
Office Action dated Aug. 11, 2016 in Korean Application No. 1020100071635.
Office Action dated Oct. 6, 2016 in Korean Application No. 1020100102737.
Office Action dated Nov. 28, 2018 in Chinese Application No. 201710265065.2.
Office Action dated Jan. 29, 2019 in Korean Application No. 10-2018-0170064.
Office Action dated May 9, 2013 in U.S. Appl. No. 13/180,869.
Ex Parte Quayle Action dated Oct. 29, 2013 in U.S. Appl. No. 13/180,869.
Notice of Allowance dated Apr. 11, 2014 in U.S. Appl. No. 13/180,869.
Notice of Allowance dated Sep. 25, 2015 in U.S. Appl. No. 14/333,297.
Notice of Allowance dated Jan. 17, 2017 in U.S. Appl. No. 15/010,680.
Notice of Allowance dated May 22, 2018 in U.S. Appl. No. 15/597,913.
Notice of Allowance dated Mar. 24, 2020 in U.S. Appl. No. 16/109,076.

(56) References Cited

OTHER PUBLICATIONS

Office Action dated Jun. 28, 2020 in Chinese Application No. 201710265065.2.
Office Action dated Dec. 8, 2020 in Korean Application No. 10-2020-0117190.
Office Action dated Feb. 9, 2021 in Korean Application No. 10-2020-0162270.
Notice of Allowance dated Aug. 24, 2022 in U.S. Appl. No. 16/911,037.
Corrected Notice of Allowance dated Sep. 12, 2022 in U.S. Appl. No. 16/911,037.
Office Action dated Mar. 15, 2023 in Korean Application No. 10-2022-0107157.
Notice of Allowance dated Dec. 7, 2023 in U.S. Appl. No. 18/058,304.

* cited by examiner

VOICE COIL MOTOR

CROSS-REFERENCE TO RELATED APPLICATIONS

This application is a continuation of U.S. application Ser. No. 18/058,304, filed Nov. 23, 2022; which is a continuation of U.S. application Ser. No. 16/911,037, filed Jun. 24, 2020, now U.S. Pat. No. 11,536,928, issued Dec. 27, 2022; which is a continuation of U.S. application Ser. No. 16/109,076, filed Aug. 22, 2018, now U.S. Pat. No. 10,739,550, issued Aug. 11, 2020; which is a continuation of U.S. application Ser. No. 15/597,913, filed May 17, 2017, now U.S. Pat. No. 10,082,637, issued Sep. 25, 2018; which is a continuation of U.S. application Ser. No. 15/010,680, filed Jan. 29, 2016, now U.S. Pat. No. 9,658,425, issued May 23, 2017; which is a continuation of U.S. application Ser. No. 14/333,297, filed Jul. 16, 2014, now U.S. Pat. No. 9,250,415, issued Feb. 2, 2016; which is a continuation of U.S. application Ser. No. 13/180,869, filed Jul. 12, 2011, now U.S. Pat. No. 8,810,936, issued Aug. 19, 2014; which claims the benefit under 35 U.S.C. § 119 of Korean Patent Application Nos. 10-2010-0067051, filed Jul. 12, 2010; 10-2010-0071326, filed Jul. 23, 2010; 10-2010-0071635, filed Jul. 23, 2010; and 10-2010-0102737, filed Oct. 21, 2010, which are all hereby incorporated by reference in their entirety.

BACKGROUND OF THE DISCLOSURE

Field of the Disclosure

The present disclosure relates to a voice coil motor.

Description of the Related Art

Recently, a small optical device such as a super-small digital camera on a mobile phone or a high resolution digital camera has been developed and is formed with an actuator for adjusting magnification and focus. The camera on the mobile phone or the digital camera recently employs an actuator such as a VCM (voice coil motor) on a wide range base.

The conventional super-small digital camera on the mobile phone is such that it is impossible to adjust a gap between an image sensor and lens, and a lens driving device such as a VCM for adjusting the gap between the image sensor and the lens has been developed to allow the super-small digital camera to capture an improved image.

The VCM is a motor that uses a force from a magnetic field generated by a magnet and a magnetic field generated by a coil block facing the magnet, such that the VCM is adequate in adjusting a gap between a lens and an image sensor in a camera module to enable obtainment of an improved image from the mobile phone.

A conventional VCM employed for the super-small digital camera used to be unable to adjust a gap between a lens condensing outside light and an image sensor converting the outside light to an image.

The conventional VCM includes a cylindrical bobbin mounted therein with a lens, a coil block wound with a coil at a periphery of the bobbin, and an elastic member elastically supporting a magnet opposite to the coil block and the bobbin.

The elastic member is coupled to a boss protruded from a bottom distal end of the bobbin, where the bobbin is moved upwards by a force generated by a magnetic field generated by the coil, and the elastic member elastically supports the bobbin.

However, the conventional VCM suffers from disadvantages in that a gap is frequently generated between the bobbin and the elastic member arranged under the bobbin by a manufacturing tolerance of the bobbin and the elastic member, and it is difficult to accurately adjust an interval between a lens and an image sensor due to the gap between the bobbin and the elastic member arranged under the bobbin.

Meantime, a part of a leaf spring is coupled to the bobbin by way of insert method, and to be more specific, the part of the leaf spring is injected along with the bobbin to couple the bobbin to the leaf spring when the bobbin is injected.

Alternatively, a boss formed at a distal end of the bobbin is coupled to the leaf spring, and the leaf spring coupled to the boss is coupled to the distal end of the bobbin by way of thermal fusion method.

In a case the part of the leaf spring is coupled to the bobbin by way of insert method according to the prior art, a manufacturing process becomes complicated to increase a manufacturing cost, and in a case the leaf spring is inserted into the bobbin to deform the leaf spring, the leaf spring and the bobbin are disadvantageously disposed of altogether.

Another disadvantage is that in a case the leaf spring is coupled to the bobbin by the thermal fusion method, the leaf spring is disengaged from the bobbin due to vibration and/or shock applied from outside, because an attachment strength between the bobbin and the leaf spring is smaller than that of the insert method.

Alternatively, an adhesive is coated between a distal end of the bobbin and the leaf spring to increase a coupling strength between the bobbin and the leaf spring. However, another disadvantage is generated that it is difficult to improve a coupling strength between the bobbin and the leaf spring due to smaller adhesive coated area between the leaf spring and the bobbin.

Still another disadvantage is that the coil electrically connected to the leaf spring is short-circuited due to the leaf spring being disengaged from the bobbin.

Still further disadvantage is that the bobbin and the leaf spring are mutually bonded by an adhesive, and in a case the bobbin and the leaf spring are bonded by the adhesive provided by a dispenser, the leaf spring is separated along with the dispenser when the leaf spring is separated after the adhesive is coated to the leaf spring using the dispenser, to damage the leaf spring and/or cause an adhesive imperfection to the bobbin and the leaf spring.

BRIEF SUMMARY

The present disclosure is directed to cope with the above-mentioned problems and to provide a VCM (voice coil motor) configured to remove a gap generated between a bobbin and an elastic member to accurately adjust an interval between a lens and an image sensor.

The present disclosure is to provide a VCM configured to increase reliability by reducing a manufacturing cost and inhibiting an elastic member arranged on a distal end of a bobbin from being disengaged from the distal end of the bobbin by a shock or a vibration applied from outside.

The present disclosure is to provide a VCM configured to enhance a coupling power of an elastic member between a coil forming a coil block arranged on a periphery of a bobbin and an elastic member electrically connected to the coil.

Technical problems to be solved by the present disclosure are not restricted to the abovementioned description, and any other technical problems not mentioned so far will be clearly appreciated from the following description by the skilled in the art.

In one general aspect of the present disclosure, there is provided a voice coil motor comprising: a base; a yoke disposed over the base; a bobbin disposed inside the yoke and including a first protrusion unit at a lower portion and a second protrusion unit at an upper portion; a coil block disposed on a side surface of the bobbin; a magnet facing the coil block and secured at the yoke; an upper elastic member coupled to the upper portion of the bobbin and including an outer unit, an inner unit and a connection unit; and a lower elastic member coupled to the lower portion of the bobbin, wherein the lower elastic member includes a first spring and a second spring separated from the first spring, and each of the first and second springs includes an outer unit, an inner unit and a connection unit, respectively, wherein a portion of each outer unit of the first and second springs is bent to form a terminal, wherein a portion of each inner unit of the first and second springs includes a first through hole corresponding to the first protrusion unit, wherein a portion of the inner unit of the upper elastic member includes a second through hole corresponding to the second protrusion unit, and wherein the first protrusion unit is positioned at a location corresponding to the first through hole, and the second protrusion unit is positioned at a location corresponding to the second through hole.

The voice coil motor according to the present disclosure has an advantageous effect in that the adhesive guide lugs are formed at the bobbin coupled to the elastic member to inhibit the elastic member from being deformed and damaged.

BRIEF DESCRIPTION OF THE DRAWINGS

The accompanying drawings, which are included to provide a further understanding of the present disclosure and are incorporated in the present disclosure and constitute a part of this application, and together with the description, serve to explain the principle of the disclosure. In the drawings.

DETAILED DESCRIPTION

Figure 1:
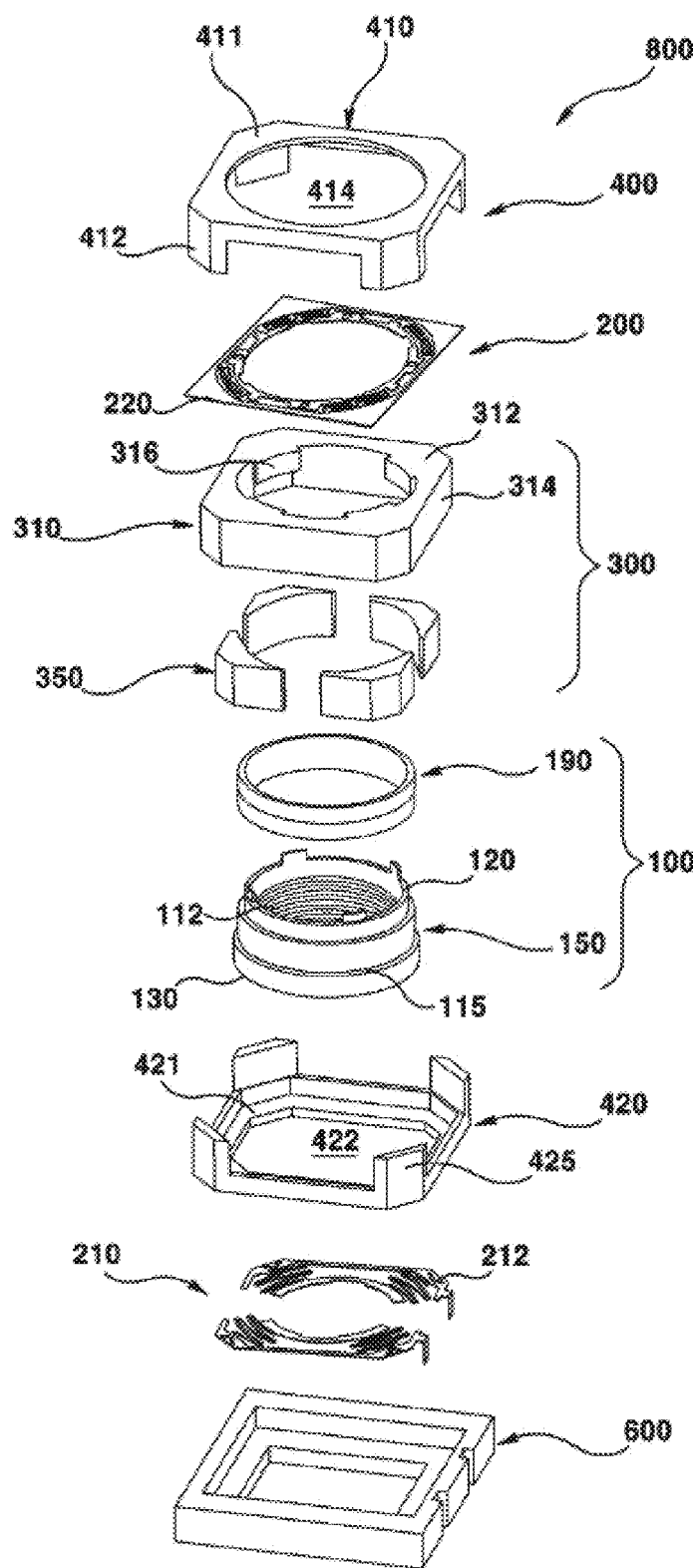
FIG. 1 is an exploded perspective view illustrating a VCM according to an exemplary embodiment of the present disclosure.

Advantages and features of the present invention may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The terms "first," "second," and the like, herein do not denote any order, quantity, or importance, but rather are used to distinguish one element from another, and the terms "a"

and "an" herein do not denote a limitation of quantity, but rather denote the presence of at least one of the referenced item.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges from less than one percent to ten percent.

Figure 2:
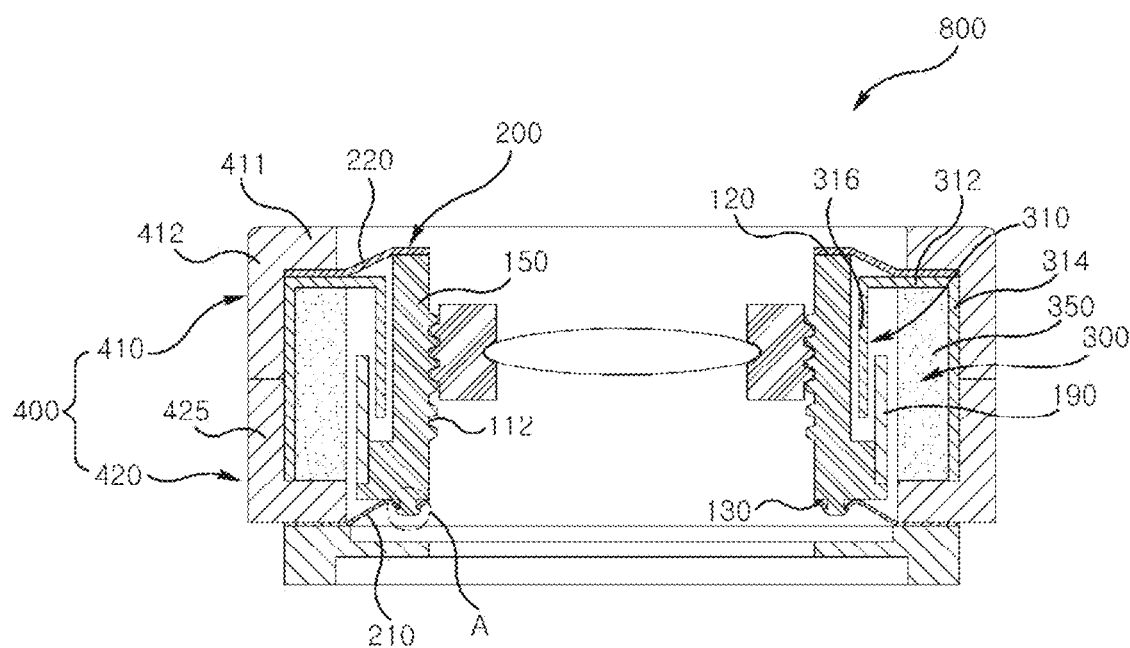
FIG. 2 is a cross-sectional view of a VCM of FIG. 1.

FIG. 1 is an exploded perspective view illustrating a VCM according to an exemplary embodiment of the present disclosure, and FIG. 2 is a cross-sectional view of a VCM of FIG. 1.

Referring to FIGS. 1 and 2, a VCM (800) includes a rotor (100), an elastic member (200), a stator (300), a case (400) and a base (600). The rotor (100) includes a bobbin (150) and a coil block (190).

The bobbin (150) takes the shape of hollow holed cylinder for accommodating a lens therein, for example. The cylindrical bobbin (150) includes an upper surface (120) and a bottom surface (130) opposite to the upper surface (120).

An inner surface of the bobbin (150) for accommodating the lens is formed with a female screw unit to which a lens fixing member (not shown) is coupled, and the lens fixing member is coupled to the lens. Alternatively, it should be also appreciated that the lens is directly coupled to the female screw unit of the bobbin (150).

A peripheral bottom distal end of the bobbin (150) is formed with a sill (115) for supporting a coil block (190, described later).

The coil block (190) of the rotor (100) is arranged on the hitching sill (115) formed at the bobbin (150), and takes the shape of a cylinder wound by a coil, for example. The coil block (190) may be directly wound on the periphery of the bobbin (150), or may be attached to the periphery of the bobbin (150) by an adhesive after being wound in the cylindrical shape.

The stator (300) includes a yoke (310) and a magnet (350). The yoke (310) includes an upper plate (312), a lateral plate (314) and a yoke unit (316). The upper plate (312) of the yoke (310) may take the shape of a square plate, when viewed from a top plan view, and is centrally formed with a circular opening for exposing the upper distal end of the bobbin (150).

The lateral plate (314) is extended to a direction parallel with the periphery of the bobbin (150) from four edges of the upper plate (312), and integrally formed with the four edges of upper plate (312). The yoke unit (316) is extended from an inner lateral surface of the upper plate (312) formed by the circular opening of the upper plate (312) to a direction facing the bottom distal end of the bobbin (150). The yoke unit (316) is inserted into a space formed by the bobbin (150) and the coil block (190).

Magnets (350) are arranged at an inner space formed by the upper plate (312) of the yoke (310) and the lateral plate (314). Each magnet (350) is arranged on a position corresponding to that of the yoke unit (316) of the yoke (310), and each magnet (350) faces the coil block (190).

The bobbin (150) is moved upwards by a force generated by magnetic field generated by the magnets (350) and a magnetic field generated by the coil block (190), and the bobbin (150) is elastically supported by first and second elastic members (210, 220). At this time, a moved distance of the bobbin (150) can be accurately adjusted by a current applied to the coil block (190).

A case (400) includes an upper case (410) and a bottom case (420). The upper case (410) includes an upper plate (411) and a coupling pillar (412). The upper case (410) is arranged on an upper surface of the yoke (310), and the second elastic member (220, described later) in the elastic member (200) is interposed between the upper case (410) and the yoke (310).

The upper plate (411) of the upper case (410) takes the shape of a square plate when viewed from a top plan view, and is centrally formed with a circular opening (414) for exposing the bobbin (150).

The coupling pillar (412) is protruded in parallel with the bobbin (150) from four corners of the upper plate (411), and is coupled to the bottom case (420, described later). The bottom case (420) includes pillars (425) coupled to each coupling pillar (412) of the upper case (410).

Figure 3:
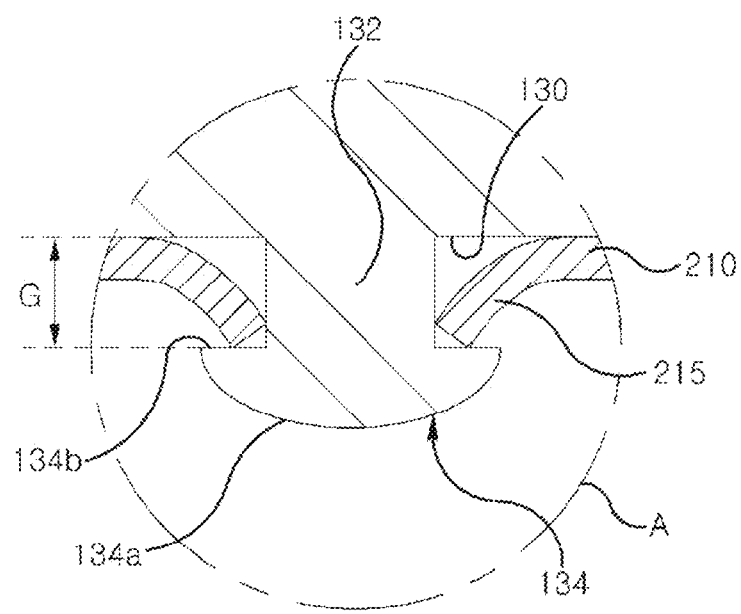
FIG. 3 is a partially enlarged view of 'A' of FIG. 2.
Figure 4:
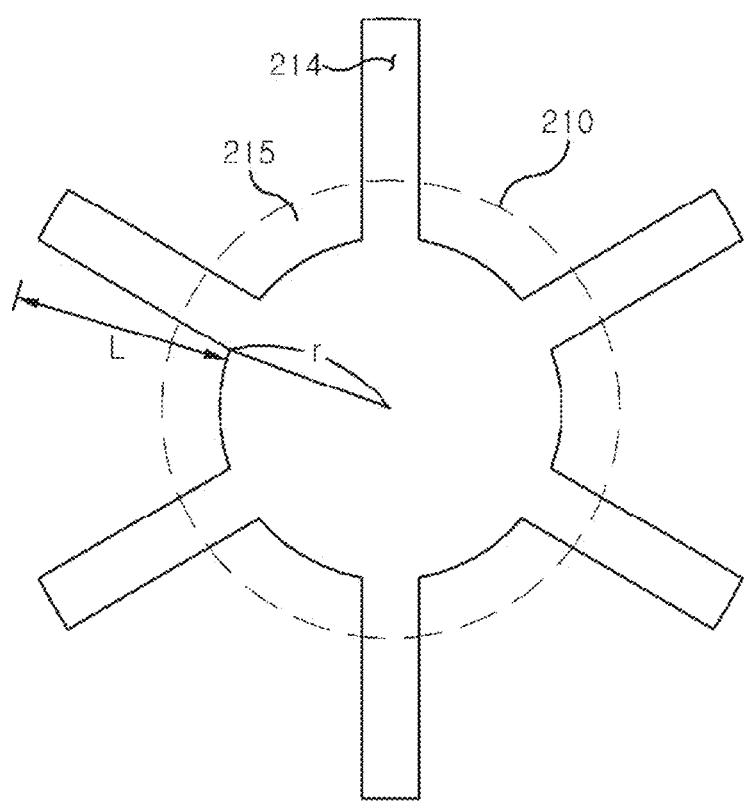
FIG. 4 is a plane view illustrating a surrounding of a through hole of a first elastic member.

FIG. 3 is a partially enlarged view of 'A' of FIG. 2, and FIG. 4 is a plane view illustrating a surrounding of a through hole of a first elastic member.

Referring to FIGS. 1, 3 and 4, the elastic member (200) in the present exemplary embodiment of the present disclosure includes a first elastic member (210) and a second elastic member (220). The first and second elastic members (210, 220) may be leaf springs, each having a thin thickness, for example.

The first elastic member (210) is coupled to a bottom surface (130) of the bobbin (150). The first elastic member (210) includes two members, for example, and each first elastic member (210) is formed with a through hole (212) for being coupled to a boss (132) formed at the bottom surface (130) of the bobbin (150). The first elastic member (210) is coupled to the boss (132) of the bobbin (150) through the through hole (212), and the boss (132) of the bobbin (150) is formed with a disengagement prevention unit (134) for inhibiting the first elastic member (210) coupled to the boss (132) of the bobbin (150) from being disengaged to outside of the boss (132) of the bobbin (150).

The disengagement prevention unit (134) is formed at an upper distal end of the boss (132) of the bobbin (150), takes the shape of a round head and is formed by applying heat and pressure to the distal end of the boss (132) of the bobbin (150). The disengagement prevention unit (134) includes a round head-shaped curvature unit (134a), and a planar unit (134b, or planar surface) opposite to the bottom surface (130) of the bobbin (150). A gap (G) is formed between the bottom surface (130) of the bobbin (150) and the planar unit (134b).

In the exemplary embodiment of the present disclosure, in a case the gap (G) formed between the bottom surface (130) of the bobbin (150) and the planar unit (134b) is substantially same as thickness of the first elastic member (210), the first elastic member (210) is not disengaged from the bottom surface (130) of the bobbin (150) but tightly contacted to the bottom surface (130) of the bobbin (150).

The gap (G) formed between the bottom surface (130) of the bobbin (150) and the planar surface (134b) of the disengagement prevention unit (134) is formed to be larger than the thickness of the first elastic member (210) due to various reasons including a manufacturing tolerance that is generated in the course of manufacturing a very small size of boss (132) of the bobbin (150), or a manufacturing tolerance that is generated in the course of forming the disengagement prevention unit (134) on the boss (132) of the bobbin (150) in a very small size.

In a case the gap (G) formed between the bottom surface (130) of the bobbin (150) and the planar unit (134b) of the disengagement prevention unit (134) is formed to be larger than the thickness of the first elastic member (210), the first elastic member (210) moves between the bottom surface (130) of the bobbin (150) and the planar surface (134b). In a case the first elastic member (210) moves between the bottom surface (130) of the bobbin (150) and the planar surface (134b), performance of adjusting a distance between the image sensor and the lens can be greatly decreased by the VCM (800).

In the exemplary embodiment of the present disclosure, even if the gap (G) formed between the bottom surface (130) of the bobbin (150) and the planar unit (134b) of the disengagement prevention unit (134) is formed to be larger than the thickness of the first elastic member (210), the first elastic member (210) is made to be tightly brought into contact with the bottom surface (130) of the bobbin (150).

The first elastic member (210) is formed with a plurality of cut-out units (214) connected to a through hole (212) in order to couple the first elastic member (210) to the boss (132) of the bobbin (150) formed at the bottom surface (130) of the bobbin (150) using the through hole (212) of the first elastic member (210).

In the exemplary embodiment of the present disclosure, the through hole (212) is smaller in diameter than that of the boss (132) of the bobbin (150), and the diameter of the boss (132) of the bobbin (150) is formed to be smaller than a sum in which a length (L) of the cut-out unit (214) and a radius (r) of the through hole (212) are added up.

The plurality of cut-out units (214) is radially formed at the first elastic member (210) about the through hole (212) of the first elastic member (210). Hereinafter, a part of the first elastic member (210) formed between the pair of adjacent cut-out units (214) is defined as a coupling unit (215).

The coupling unit (215) formed by the cut-out units (214) by insertion of the boss (132) of the bobbin (150) into the through hole (212) of the first elastic member (210) formed with the cut-out units (214) generates an elastic deformation to be coupled to the periphery of the boss (132) of the bobbin (150). The coupling unit (215) of the first elastic member (210) is secured at a corner area, where the boss (132) of the bobbin (150) and the planar surface (134b) of the disengagement prevention unit (134) meet, through formation of the disengagement prevention unit (134) at an upper end of the boss (132) of the bobbin (150) by applying heat and pressure to the upper end of the boss (132) of the bobbin (150) after the boss (132) of the bobbin (150) is coupled by the first elastic member (210). As a result, the first elastic member (210) is tightly brought into contact with the bottom surface (130) of the bobbin (150) by the coupling unit (215) of the first elastic member (210).

Figure 5:
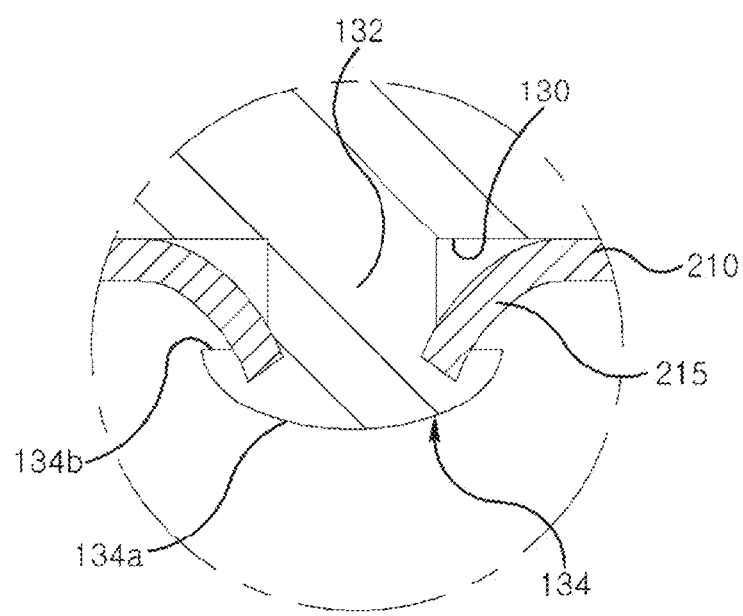
FIG. 5 is a cross-sectional view illustrating a first elastic member and a boss of a VCM according to another exemplary embodiment of the present disclosure.

FIG. 5 is a cross-sectional view illustrating a first elastic member and a boss of a VCM according to another exemplary embodiment of the present disclosure.

The VCM according to the exemplary embodiment of the present disclosure has a substantially same configuration as that of the VCM illustrated in FIGS. 1 through 4 except for the disengagement prevention unit and the first elastic member, such that explanations that duplicate one another will be omitted, and the same reference numerals will be assigned to the same elements in the explanations of the figures.

Referring to FIGS. 4 and 5, the coupling unit (215) formed by the cut-out units (214) by insertion of the boss (132) of the bobbin (150) into the through hole (212) of the first elastic member (210) formed with the cut-out units (214) generates an elastic deformation to be coupled to the periphery of the boss (132) of the bobbin (150).

The upper end of the boss (132) of the bobbin (150) is formed with the disengagement prevention unit (134) having a larger area than that of the boss (132) of the bobbin (150) as the coupling unit (215) is coupled to the periphery of the boss (132) of the bobbin (150), and heat and pressure are applied to the upper end of the boss (132) of the bobbin (150).

In the exemplary embodiment of the present disclosure, a distal end of the coupling unit (215) coupled to the periphery of the boss (132) of the bobbin (150) is inserted into the disengagement prevention unit (134) at a predetermined depth, whereby the first elastic member (210) is securely fixed at the interior of the disengagement prevention unit (134).

As the coupling unit (215) of the first elastic member (210) is fixedly inserted into the disengagement prevention unit (134), the first elastic member (210) is inhibited from being disengaged from the bottom surface of the bobbin (150) to accurately control a moving distance of the bobbin (150).

Figure 6:
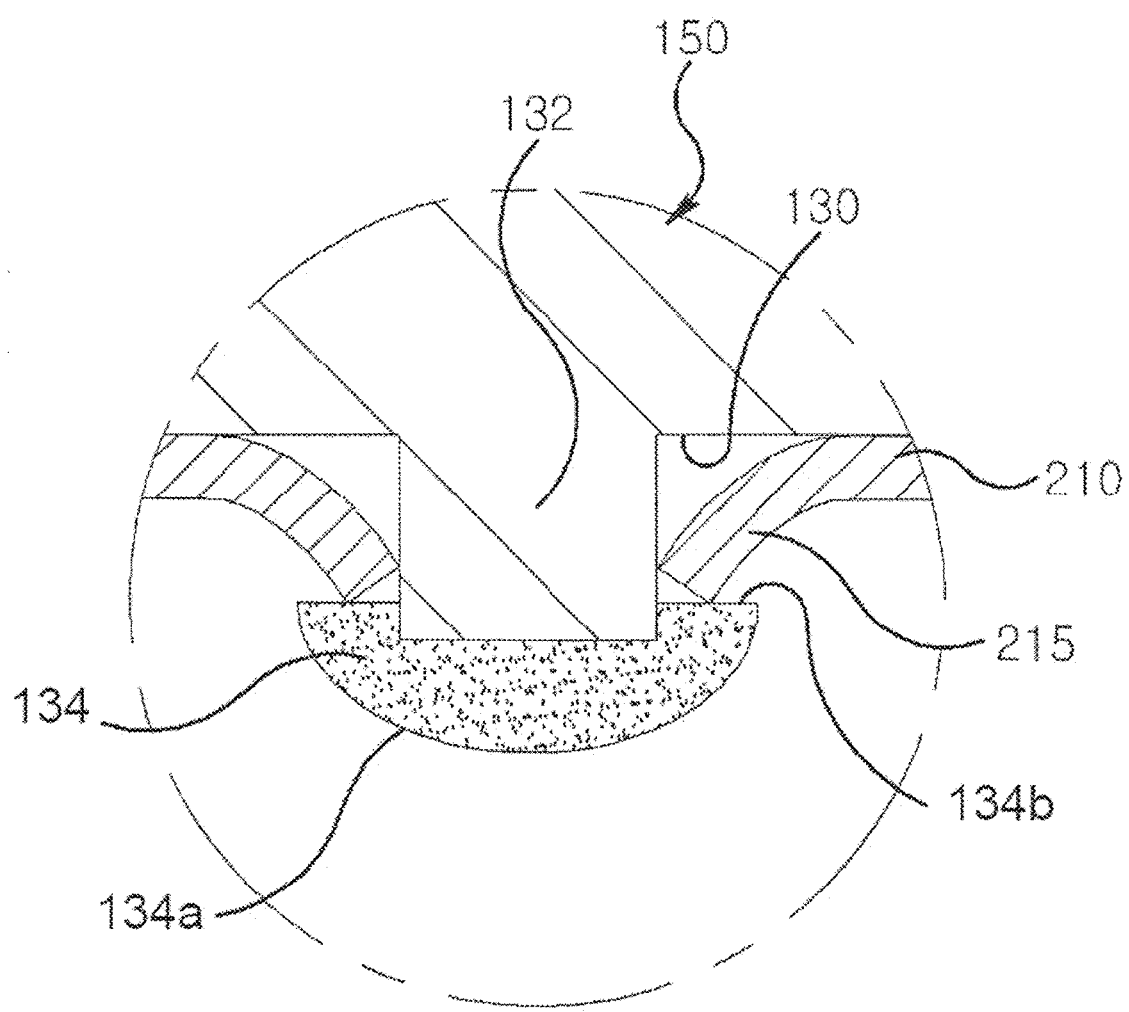
FIG. 6 is a cross-sectional view illustrating a first elastic member and a boss of a VCM according to still another exemplary embodiment of the present disclosure.

FIG. 6 is a cross-sectional view illustrating a first elastic member and a boss of a VCM according to still another exemplary embodiment of the present disclosure.

The VCM according to the exemplary embodiment of the present disclosure has a substantially same configuration as that of the VCM illustrated in FIGS. 1 through 4 except for the disengagement prevention unit and the first elastic member, such that explanations that duplicate one another will be omitted, and the same reference numerals will be assigned to the same elements in the explanations of the figures.

Referring to FIGS. 4 and 6, as the cylindrical boss (132) of the bobbin (150) is inserted into the through hole (212) of the first elastic member (210) formed with the cut-out units (214), the coupling unit (215) formed by the cut-out units (214) generates an elastic deformation to be coupled to the periphery of the boss (132) of the bobbin (150). The coupling unit (215) is inserted into the boss (132) of the bobbin (150) in a crooked shape relative to the first elastic member (210).

After the coupling unit (215) is coupled to the periphery of the boss (132) of the bobbin (150), the upper end of the boss (132) of the bobbin (150) is coated with adhesive, and the adhesive is cured by heat of ultraviolet to allow a disengagement prevention unit (136) having a larger area than that of the boss (132) of the bobbin (150) to be formed at the upper end of the boss (132) of the bobbin (150). In the exemplary embodiment of the present disclosure, the adhesive forming the disengagement prevention unit (136) may include an ultraviolet curing adhesive that is cured by ultraviolet, or a thermally curable adhesive that is cured by heat.

The disengagement prevention unit (136) formed by the adhesive includes a round-headed curvature unit (136a), and a planar unit (136b) connected to the curvature unit (136a), and the coupling unit (215) of the first elastic member (210) is arranged at a place where the planar unit (136b) of the disengagement prevention unit (136) and the periphery of the boss (132) of the bobbin (150) meet.

As the coupling unit (215) of the first elastic member (210) is fixed at a place where the planar unit (136b) of the disengagement prevention unit (136) and the periphery of the boss (132) of the bobbin (150) meet, the first elastic member (210) is inhibited from being disengaged from the bottom surface (130) of the boss (132) of the bobbin (150) to accurately control a moving distance of the bobbin (150).

Figure 7:
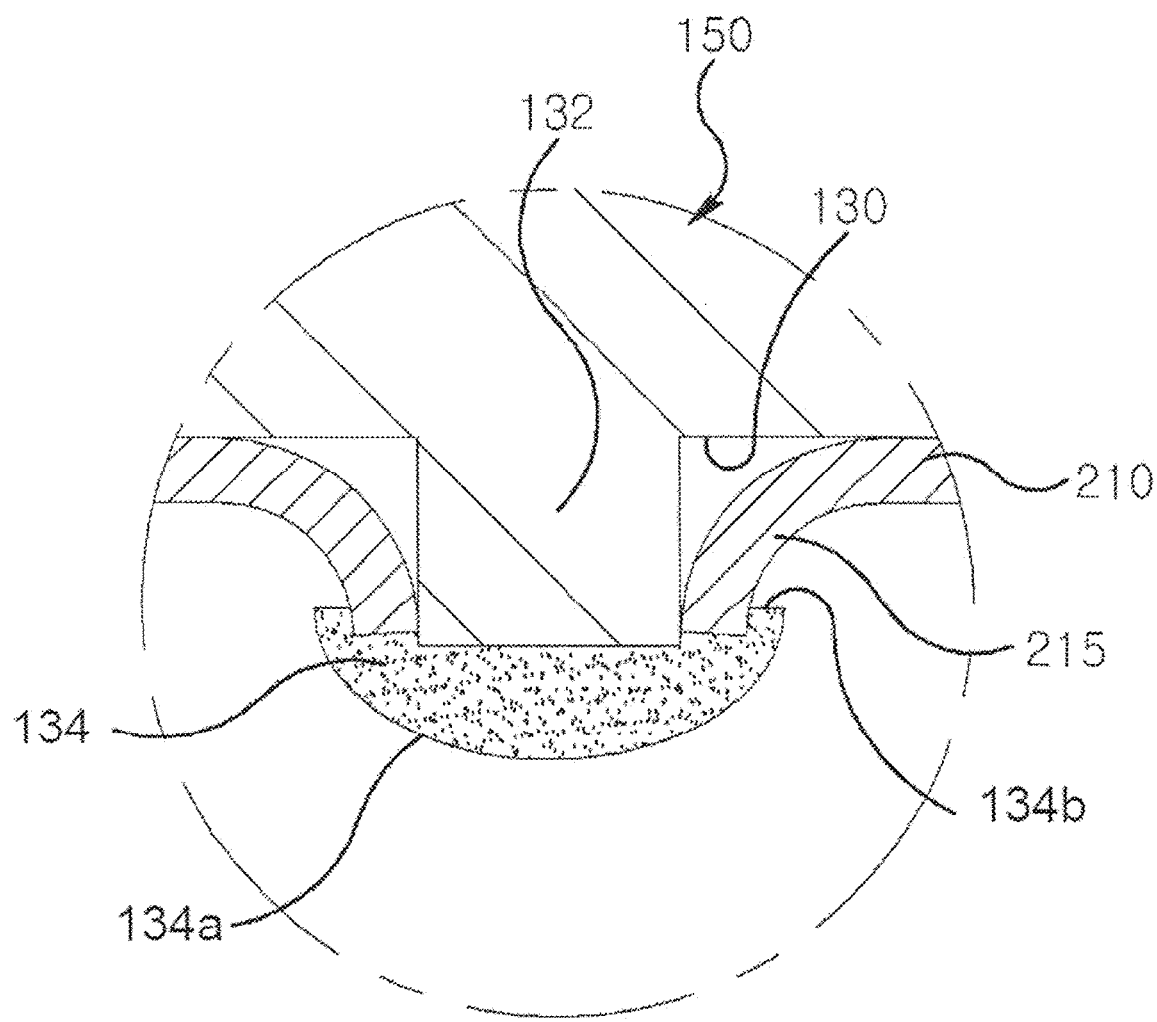
FIG. 7 is a cross-sectional view illustrating a first elastic member and a boss of a VCM according to still another exemplary embodiment of the present disclosure.

FIG. 7 is a cross-sectional view illustrating a first elastic member and a boss of a VCM according to still another exemplary embodiment of the present disclosure.

The VCM according to the exemplary embodiment of the present disclosure has a substantially same configuration as that of the VCM illustrated in FIG. 6 except for the disengagement prevention unit and the first elastic member, such that explanations that duplicate one another will be omitted, and the same reference numerals will be assigned to the same elements in the explanations of the figures.

Referring to FIGS. 4 and 7, as the cylindrical boss (132) of the bobbin (150) is inserted into the through hole (212) of the first elastic member (210) formed with the cut-out units (214), the coupling unit (215) formed by the cut-out units (214) generates an elastic deformation to be coupled to the periphery of the boss (132) of the bobbin (150). The coupling unit (215) is inserted into the boss (132) of the bobbin (150) in a crooked shape relative to the first elastic member (210).

After the coupling unit (215) is coupled to the periphery of the boss (132) of the bobbin (150), the upper end of the boss (132) of the bobbin (150) is coated with adhesive, and the adhesive is cured by heat of ultraviolet to allow a disengagement prevention unit (136) having a larger area than that of the boss (132) of the bobbin (150) to be formed at the upper end of the boss (132) of the bobbin (150). In the exemplary embodiment of the present disclosure, the adhesive forming the disengagement prevention unit (136) may include an ultraviolet curing adhesive that is cured by ultraviolet, or a thermally curable adhesive that is cured by heat.

The disengagement prevention unit (136) formed by the adhesive includes a round-headed curvature unit (136a), and a planar unit (136b) connected to the curvature unit (136a), and at least a part of the coupling unit (215) of the first elastic member (210) is inserted into the disengagement prevention unit (136). To be more specific, the coupling unit (215) of the first elastic member (210) is inserted into the disengagement prevention unit (136) while uncured adhesive is coated on the boss (132) of the bobbin (150) or adhesive is being cured.

As the coupling unit (215) of the first elastic member (210) is inserted into the disengagement prevention unit (136), the first elastic member (210) is inhibited from being disengaged from the bottom surface (130) of the boss (132) of the bobbin (150) to accurately control a moving distance of the bobbin (150) mounted with the lens.

Figure 8:
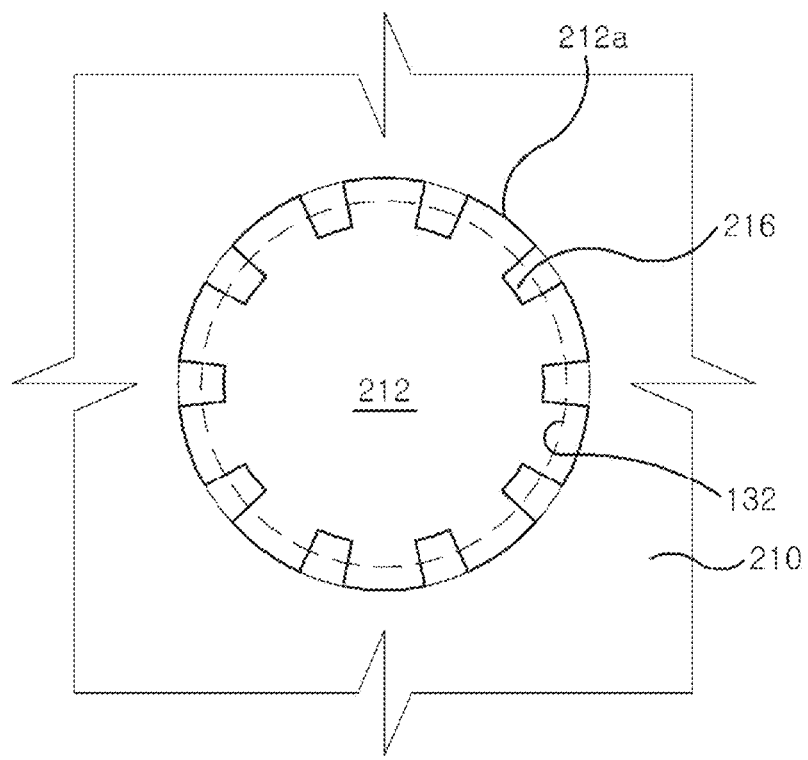
FIG. 8 is a plane view illustrating a first elastic member of a VCM according to still another exemplary embodiment of the present disclosure.
Figure 9:
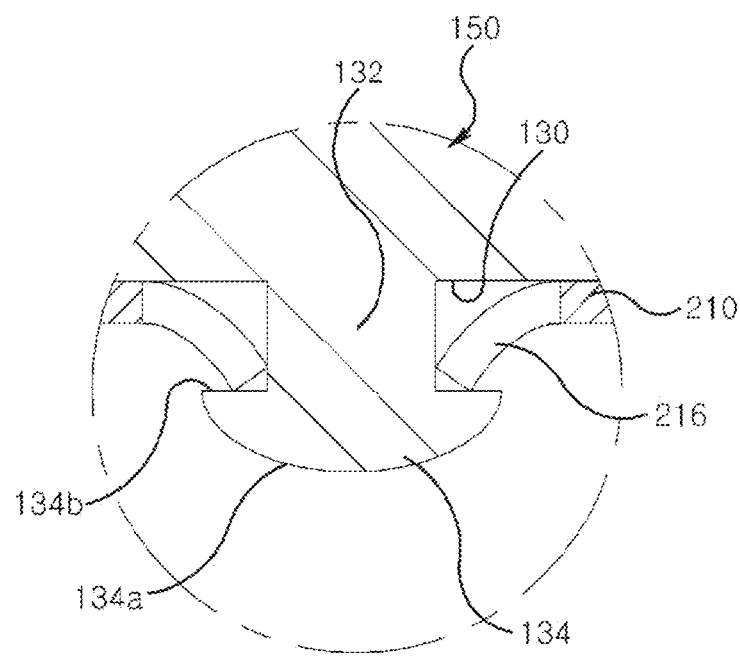
FIG. 9 is a cross-sectional view illustrating a first elastic member and a heat-fused disengagement prevention unit of FIG. 8.
Figure 10:
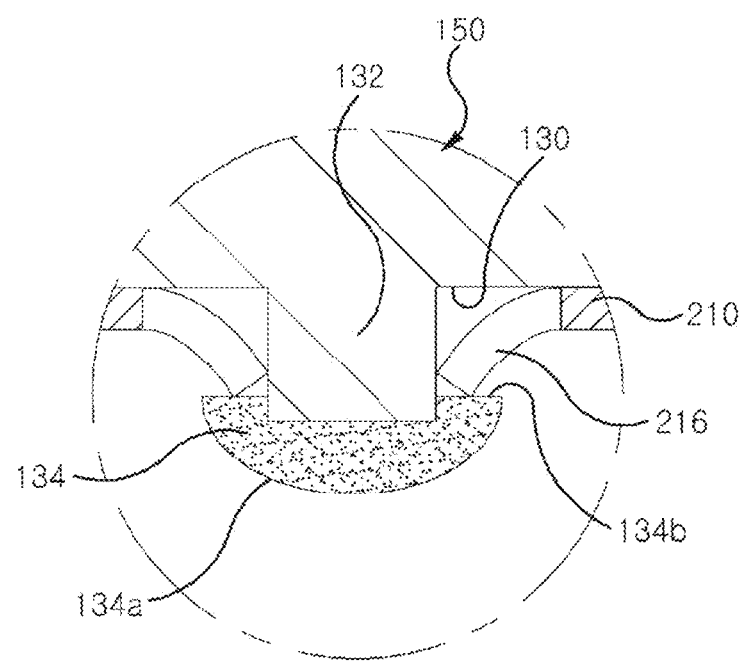
FIG. 10 is a cross-sectional view illustrating a disengagement prevention unit formed with a boss coupled to the first elastic member and an adhesive of FIG. 8.

FIG. 8 is a plane view illustrating a first elastic member of a VCM according to still another exemplary embodiment of the present disclosure, FIG. 9 is a cross-sectional view illustrating a first elastic member and a heat-fused disengagement prevention unit of FIG. 8, and FIG. 10 is a cross-sectional view illustrating a disengagement prevention unit formed with a boss coupled to the first elastic member and an adhesive of FIG. 8.

The VCM according to still another exemplary embodiment of the present disclosure has a substantially same configuration as that of the VCM illustrated in FIGS. 1 through 6 except for the first elastic member, such that explanations that duplicate one another will be omitted, and the same reference numerals will be assigned to the same elements in the explanations of the figures.

Referring to FIGS. 8, 9 and 10, the first elastic member (210) includes the through hole (212) coupled to the boss (132) of the bobbin (150) formed at the bottom surface (130) of the bobbin (150). In the exemplary embodiment of the present disclosure, a diameter of the through hole (212) is formed to be greater than that of the boss (132) of the bobbin (150), such that a space is formed between the inner lateral surface (212a) of the first elastic member (210) formed by the through hole (212) and the periphery of the boss (132) of the bobbin (150).

A plurality of coupling units (216) is protruded, each at a predetermined gap, from the inner lateral surface (212a) of the first elastic member (210) formed by the through hole (212), and a length of each coupling unit (216) is formed to be longer than a difference between the diameter of the through hole (212) and the diameter of the boss (132) of the bobbin (150). As a result, as the boss (132) of the bobbin (150) is coupled to the through hole (212), the periphery of the boss (132) of the bobbin (150) is elastically arranged with the plurality of coupling units (216) each protruded from the inner lateral surface (212a) of the first elastic member (210).

Referring to FIG. 9, after the coupling units (216) formed at the first elastic member (210) are arranged at the periphery of the boss (132) of the bobbin (150), the upper end of the boss (132) of the bobbin (150) is deformed by heat and pressure to form a disengagement prevention unit (134) at the boss (132) of the bobbin (150), and a place, where a planar unit (134b) of the disengagement prevention unit (134) and the periphery of the boss (132) of the bobbin (150) meet, is arranged with the coupling units (216) of the first elastic member (210) to allow the first elastic member (210) to be tightly brought into contact with the bottom surface (130) of the bobbin (150). Alternatively, when the disengagement prevention unit (134) is formed at the boss (132) of the bobbin (150), a part of the coupling units (216) of the first elastic member (210) may be inserted into the disengagement prevention unit (134).

Meanwhile, as illustrated in FIG. 10, after the coupling units (216) formed at the first elastic member (210) is arranged to the periphery of the boss (132) of the bobbin (150), the upper end of the boss (132) of the bobbin (150) is coated with adhesive, and the adhesive is cured by heat of ultraviolet to allow a disengagement prevention unit (136) to be formed at the boss (132) of the bobbin (150), and a place, where a planar unit (134b) of the disengagement prevention unit (136) and the periphery of the boss (132) of the bobbin (150) meet, is arranged with the coupling units (216) of the first elastic member (210). Alternatively, when the disengagement prevention unit (136) is formed at the boss (132) of the bobbin (150), a part of the coupling units (216) of the first elastic member (210) may be inserted into the disengagement prevention unit (136).

Referring to FIG. 1 again, the second elastic member (220) is coupled to the upper surface (120) of the bobbin (150), and the bobbin (150) mounted with the coil block (190) is elastically supported by the first and second elastic members (210, 220).

As apparent from the foregoing, the elastic member is inhibited from moving from the bobbin by the gap formed between the bobbin and the elastic member elastically supporting the bobbin to thereby accurately control a distance between the lens mounted on the bobbin and the image sensor.

Figure 11:
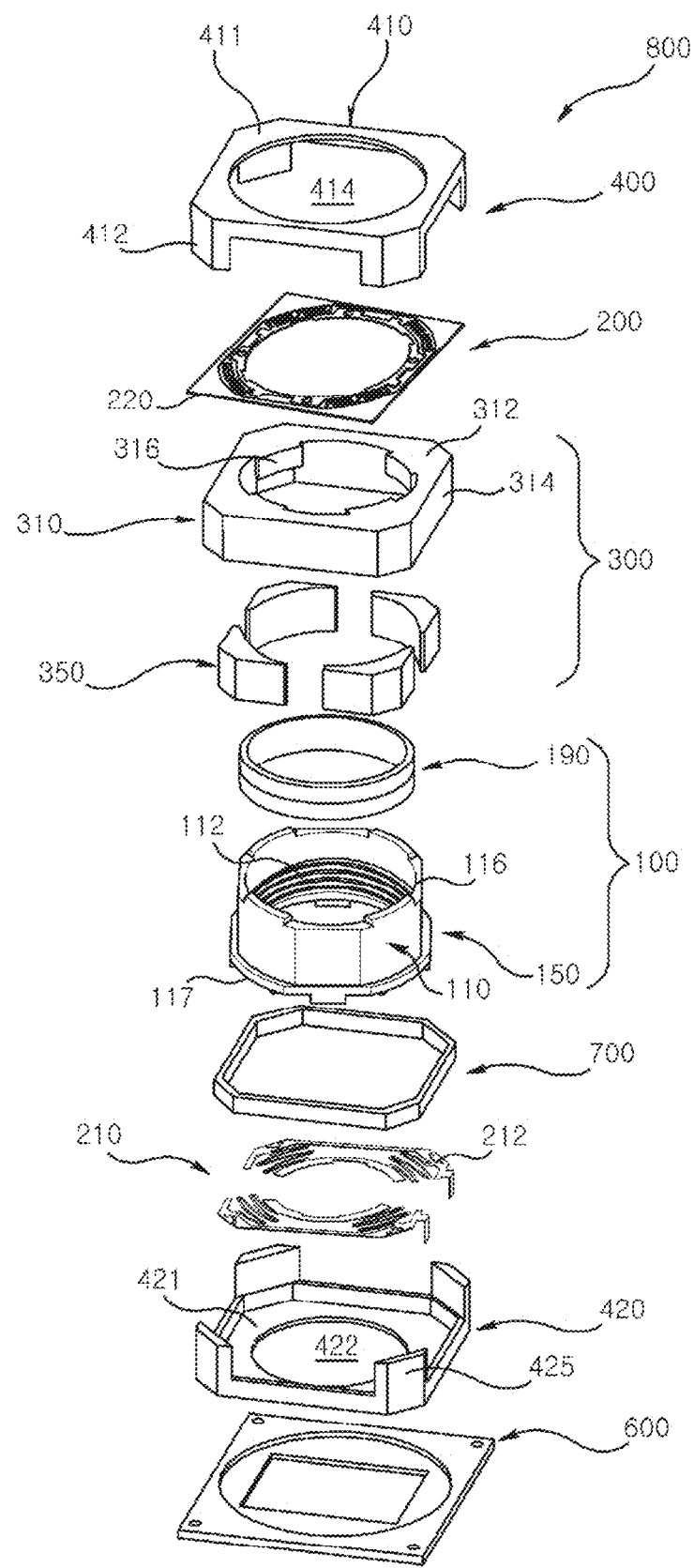
FIG. 11 is an exploded perspective view of a VCM according to an exemplary embodiment of the present disclosure.
Figure 12:
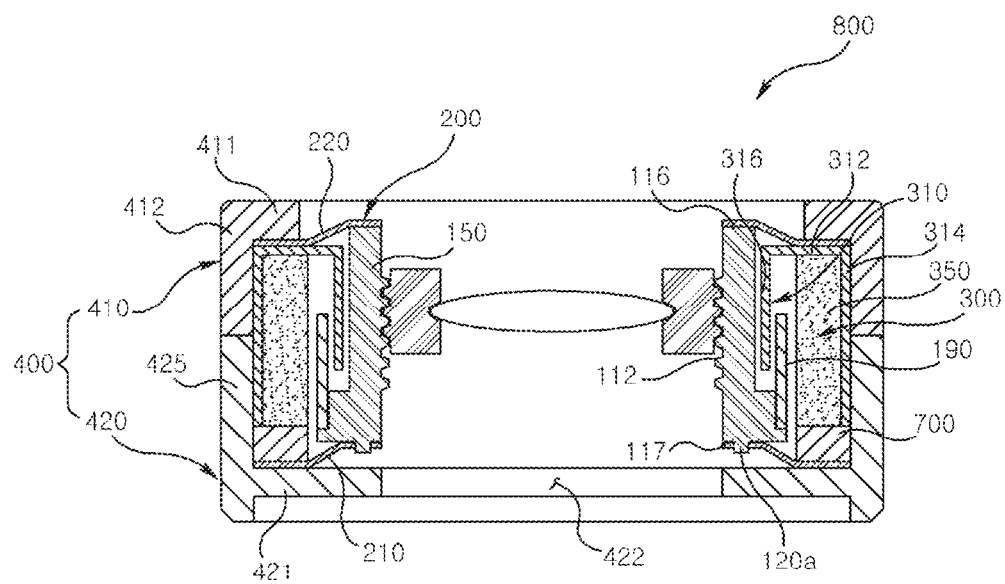
FIG. 12 is a cross-sectional view of a VCM illustrated in FIG. 11.
Figure 13:
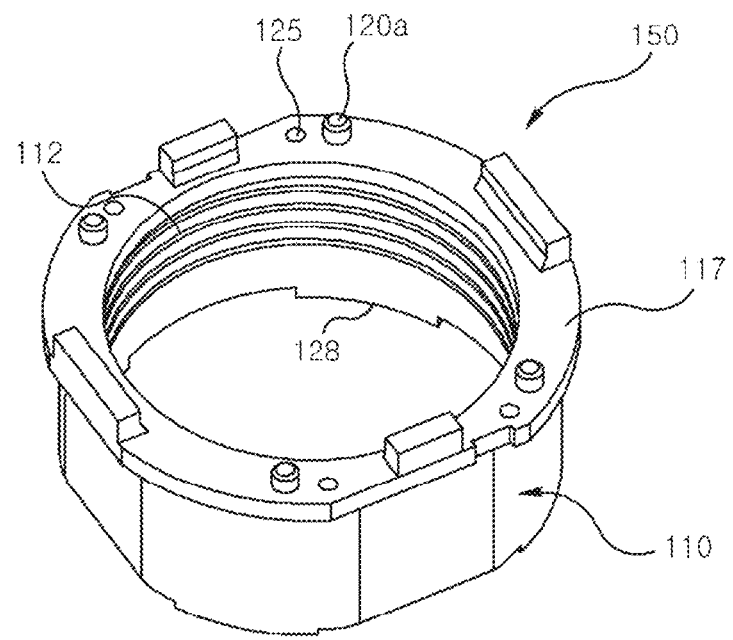
FIG. 13 is a plane view illustrating a rear surface of a bobbin of FIG. 11.
Figure 14:
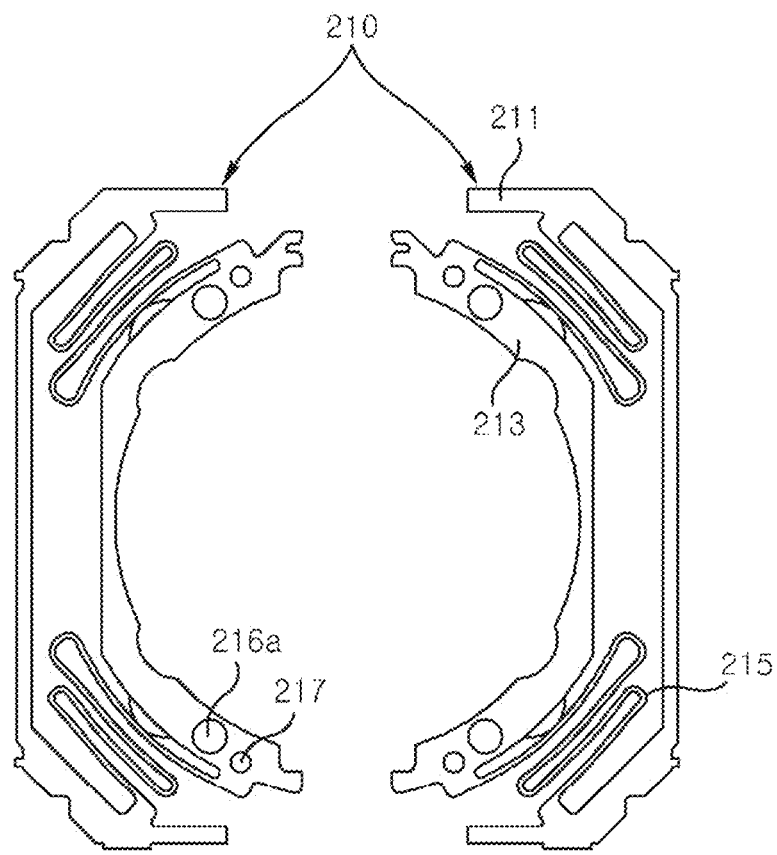
FIG. 14 is a plane view illustrating a first elastic member of FIG. 11.
Figure 15:
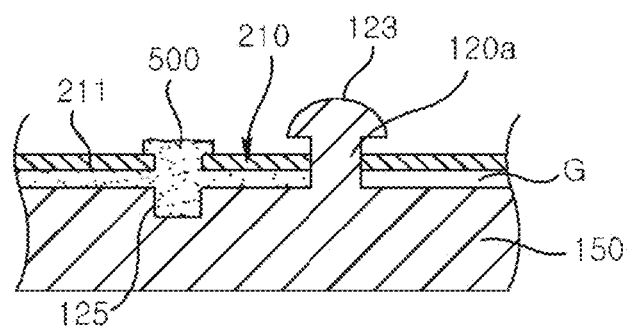
FIG. 15 is a cross-sectional view illustrating a state in which the bobbin and the first elastic member of FIG. 11.

FIG. 11 is an exploded perspective view of a VCM according to an exemplary embodiment of the present disclosure, FIG. 12 is a cross-sectional view of a VCM illustrated in FIG. 11, FIG. 13 is a plane view illustrating a rear surface of a bobbin of FIG. 11, FIG. 14 is a plane view illustrating a first elastic member of FIG. 11 and FIG. 15 is a cross-sectional view illustrating a state in which the bobbin and the first elastic member of FIG. 11.

Referring to FIGS. 11 through 15, a VCM (800) includes a rotor (100), an elastic member (200), a stator (300), a reinforcement member (500, see FIG. 5) and a case (400). The VCM (800) may further include a base plate (600) and a spacer (700). The rotor (100) includes a bobbin (150) and a coil block (190).

Referring to FIGS. 12 and 13, the bobbin (150) includes a bobbin body (110), a coupling boss (120a) and a recess (125). The bobbin body (110) takes the shape of a hollow holed cylinder for accommodating a lens therein, for example. The cylindrical bobbin body (110) includes an upper surface (116) and a bottom surface (117) opposite to the upper surface (116).

An inner surface of the bobbin body (110) for accommodating the lens is formed with a female screw unit (112) to which a lens fixing member (not shown) is coupled, and the lens fixing member is coupled to the lens. Alternatively, it should be also appreciated that the lens is directly coupled to the female screw unit (112) of the bobbin body (110).

A peripheral bottom distal end of the bobbin body (110) is formed with a hitching sill (115) for supporting a coil block (190, described later).

Referring to FIG. 13, the coupling boss (120a) is protruded from the bottom surface (117) of the bobbin body (110) to fix first elastic members (210, described later) of the elastic member (200). Four coupling bosses (120a) are formed at four corners of the bobbin body (110), each formed at an equidistance on the bottom surface of the bobbin body (110) to be stably coupled to the first elastic member (210).

Referring to FIG. 15, after the first elastic member (210) is coupled to the bottom surface (117) of the bobbin (150), each distal end of the coupling bosses (120a) is thermally fused to inhibit the first elastic member (210) from being disengaged from the bobbin (150), whereby the distal end of the coupling boss (120a) is formed with a head unit (123) greater than the original coupling boss (120a) size-wise.

Referring to FIG. 13 again, the recess (125) is adjacently formed with each coupling boss (120a) at the bottom surface of the bobbin body (110), and the first elastic members (210, described later) are secured to the bottom surface of the bobbin (150) along with the coupling boss (120a)

In the exemplary embodiment of the present disclosure, the recess (125) is adjacently formed with a distal end of the first elastic members (210, described later). The reason that the recess (125) is adjacently formed with a distal end of the first elastic members (210) is because a force to lift the first elastic member (210) from the bobbin (150) is applied to the first elastic member (210) when the bobbin (150) is vertically operated.

The coil block (190) is arranged on the hitching sill (115) formed on the bobbin (150), and takes the shape of a cylinder wound with a coil, for example. The coil block (190) may be secured to the hitching sill (115) of the bobbin (150) and/or to the periphery of the bobbin (150) using an adhesive, and the coil forming the coil block (190) is electrically connected to the first elastic member (210) of a leaf spring (200, described later).

Referring to FIGS. 11 and 12 again, the stator (300) includes a yoke (310) and a magnet (350). The yoke (310) includes an upper plate (312), a lateral plate (314) and a yoke unit (316). The yoke (310) serves to inhibit the magnetic flux generated from the magnet (350, described later) from leaking to the outside of the yoke (310).

The upper plate (312) of the yoke (310) may take the shape of a square plate, when viewed from a top plan view, and is centrally formed with a circular opening for exposing the upper distal end of the bobbin (150).

The lateral plate (314) is extended to a direction parallel with the periphery of the bobbin (150) from four edges of the upper plate (312), and integrally formed with the four edges of upper plate (312). The yoke unit (316) is protruded from an inner lateral surface of the upper plate (312) formed by the circular opening of the upper plate (312) to a direction facing the bottom distal end of the bobbin (150), where the yoke unit (316) and the lateral plate (314) are mutually arranged in parallel. The yoke unit (316) is inserted into a space formed by the bobbin (150) and the coil block (190). The yoke unit (316) further enhances a driving efficiency of the rotor (100) by causing the magnetic flux generated from the coil block (190) to face the magnet (350).

The magnets (350) are arranged at an inner space formed by the upper plate (312) of the yoke (310) and the lateral plate (314). Each magnet (350) is arranged opposite to the coil block (190).

The bobbin (150) is moved upwards by a force generated by magnetic field generated by the magnets (350) and a magnetic field generated by the coil block (190), and the moved bobbin (150) is elastically supported by the elastic members (200, described later). At this time, a moved distance of the bobbin (150) can be accurately adjusted by a current applied to the coil block (190).

Referring to FIGS. 11, 12 and 14 again, the elastic member (200) includes first and second elastic members (210, 220). The first elastic member (210) is elastically coupled to the bottom surface (117) of the bobbin (150), and the second elastic member (220) is elastically coupled to the upper surface (116) of the bobbin (150).

Two first elastic members (210) may be formed, for example, and each of the first elastic members (210) is symmetrically formed to be coupled to the bottom surface (117) of the bobbin (150). Meanwhile, one second elastic member (220) may be formed, for example.

Each of the two first elastic members (210) is formed by processing a metal plate having a thin thickness, and the two first elastic members (210) having an electrical conductivity is electrically connected to the coil of the coil block (190).

A driving signal applied from outside is supplied to the coil block (190) through the two first elastic members (210), and a magnetic field is generated from the coil block (190).

Referring to FIGS. 13 and 14, each of the first elastic members (210) includes an external leaf spring unit (211), and an inner leaf spring unit (213) and a connection spring (215) elastically connecting the external leaf spring unit (211) and the inner leaf spring unit (213).

Both distal ends of the inner leaf spring unit (213) of the first elastic member (210) are formed with a first through hole (216a) and a second through hole (217). The first through hole (216a) is formed at both distal ends of the inner leaf spring unit (213) in opposition to the coupling boss (120a) of the bobbin (150) and inserted into the coupling boss (120a) of the bobbin (150).

In a case the first through hole (216a) of the inner leaf spring unit (213) is inserted into the coupling boss (120a) of the bobbin (150), the inner leaf spring unit (213) is arranged on the bottom surface (117) of the bobbin (150). After the first through hole (216a) of the inner leaf spring unit (213) is inserted into the coupling boss (120a) of the bobbin (150), and heat and pressure are applied to the coupling boss (120a), the distal end of the coupling boss (120a) is formed with a head unit (123) that is greater than the first through hole (216a) size-wise by thermal fusing process and fused into the inner leaf spring unit (213).

The second through hole (217) is formed at both distal ends of the inner leaf spring unit (213) in opposition to the recess (125) of the bobbin (150) to expose the recess (125) to the outside of the first elastic member (210).

In the exemplary embodiment of the present disclosure, after the first through hole (216a) of the first elastic member (210) is coupled by the coupling boss (120a) of the bobbin (150), the second through hole (217) of the first elastic member (210) and the recess (125) formed on the bottom surface (117) of the bobbin (150) corresponding to the second through hole (217) are employed to mutually couple the first elastic member (210) and the bobbin (150).

Referring to FIG. 15 again, the reinforcement member (500) is arranged on the second through hole (217) of the first elastic member (210) and the recess (125) of the bobbin (150) to reinforce the coupling strength between the bobbin (150) and the first elastic member (210) along with the coupling boss (120a) and the first through hole (216a), whereby durability of the VCM (800) can be enhanced.

The reinforcement member (500) according to the exemplary embodiment of the present disclosure includes an adhesive, and if a fluid adhesive is provided into the recess (125) of the bobbin (150) through the second through hole (217), the fluid adhesive fills an empty space formed by the recess (125) of the bobbin (150) and the second through hole (217) through capillary phenomenon, and as shown in FIG. 15, the fluid adhesive is spread to a gap between the first elastic member (210) and the bottom surface (117) of the bobbin (150) through the capillary phenomenon to greatly increase a contact area between the first elastic member (210) and the bottom surface (117) of the bobbin (150).

In a case the fluid adhesive is filled in the second through hole (217) and the recess (125) of the bobbin (150), the adhesive is cured to form the reinforcement member (500) connecting the recess (125) of the bobbin (150) and the second through hole (217). In the exemplary embodiment of the present disclosure, the adhesive may include a thermally curable adhesive.

Referring to FIGS. 11 and 12 again, the case (400) includes an upper case (410) and a bottom case (420). The upper case (410) includes an upper plate (411) and a coupling pillar (412). The upper case (410) is arranged on an upper surface of the yoke (310), and the second elastic member (220) of the leaf spring is interposed between the upper plate (411) of the upper case (410) and the yoke (310).

The upper plate (411) of the upper case (410) takes the shape of a square plate, when viewed from a top plan view, and is centrally formed with a circular opening (414) for exposing the bobbin (150).

The coupling pillar (412) is protruded in parallel with the bobbin (150) from four corners of the upper plate (411), and is coupled to the bottom case (420, described later). The bottom case (420) includes a floor plate (421) and a coupling pillar (424). The floor plate (421) takes the shape of a plate and is centrally formed with a circular opening (422).

The floor plate (421) is formed with pillars (424) coupled to each coupling pillar (412) of the upper case (410). The coupling pillar (412) of the upper case (410) and the coupling pillar (421) of the bottom case (420) may be coupled by way of half lap-joint method, for example.

The floor plate (421) of the bottom case (420) is arranged thereon with the outer leaf spring unit (211) of the first elastic member (210) coupled to the bottom surface (130) of the bobbin (150). The upper surface of the outer leaf spring unit (211) of the first elastic member (210) is arranged thereon with a square-framed spacer (700) to cause the outer leaf spring unit (211) of the first elastic member (210) to be interposed between the floor plate (421) of the bottom case (410) and the spacer (700).

Figure 16:
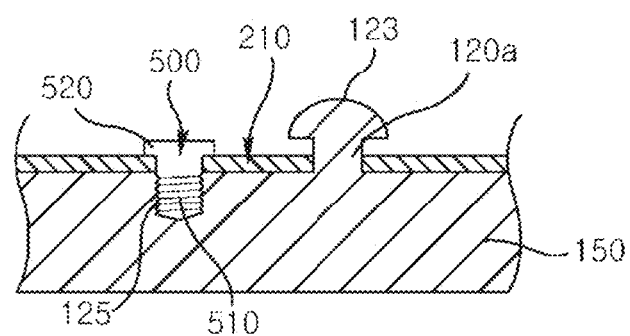
FIG. 16 is a cross-sectional view illustrating a state in which a bobbin and a first elastic member of a VCM according to another exemplary embodiment of the present disclosure.

FIG. 16 is a cross-sectional view illustrating a state in which a bobbin and a first elastic member of a VCM according to another exemplary embodiment of the present disclosure.

The VCM according to still another exemplary embodiment of the present disclosure has a substantially same configuration as that of the VCM illustrated in FIG. 15 except for the reinforcement member, such that explanations that duplicate one another will be omitted, and the same reference numerals will be assigned to the same elements in the explanations of the figures.

Referring to FIG. 16, the reinforcement member (500) of the VCM (800) is inserted into the recess (125) of the bobbin (150) through the second through hole (217) of the first elastic member (210) to reinforce the coupling strength between the bobbin (150) and the first elastic member (210) along with the coupling boss (120a), whereby durability of the VCM (800) can be increased.

The reinforcement member (500) according to another exemplary embodiment of the present disclosure includes a screw body (510) and a fastening member including a head unit (520). The periphery of the screw body (510) is formed with a screw thread, and is screwed to an inner lateral surface formed by the recess (125) of the bobbin (150).

The head unit (520) is formed to be larger than the second through hole (217) size-wise, and in a case the screw body (510) is coupled to the recess (125) of the bobbin (150), the head unit (520) is brought into contact with the bottom surface of the first elastic members (210) opposite to the bottom case (420) to inhibit the first elastic members (210) from being disengaged from the bobbin (150).

Figure 17:
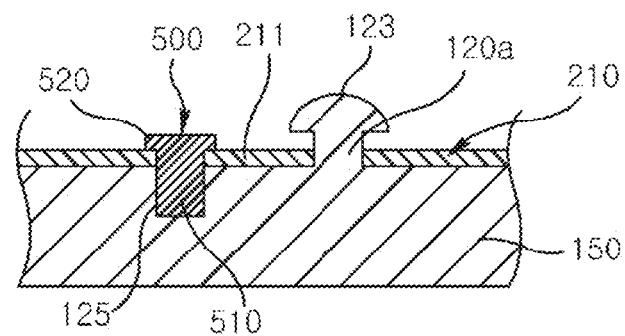
FIG. 17 is a cross-sectional view illustrating a state in which a bobbin and a first elastic member of a VCM according to still another exemplary embodiment of the present disclosure.

FIG. 17 is a cross-sectional view illustrating a state in which a bobbin and a first elastic member of a VCM according to still another exemplary embodiment of the present disclosure.

The VCM according to still another exemplary embodiment of the present disclosure has a substantially same configuration as that of the VCM illustrated in FIG. 15 except for the reinforcement member, such that explanations that duplicate one another will be omitted, and the same reference numerals will be assigned to the same elements in the explanations of the figures.

Referring to FIG. 17, the reinforcement member (500) of the VCM (800) is inserted into the recess (125) of the bobbin (150) through the second through hole (217) of the first elastic member (210) to reinforce the coupling strength between the bobbin (150) and the first elastic member (210) along with the coupling boss (120a), whereby durability of the VCM (800) can be increased.

The reinforcement member (500) according to another exemplary embodiment of the present disclosure includes a body (510) and a coupling pin including a head unit (520). The body (510) is press-fitted into the recess (125) of the bobbin (150). The head unit (520) is formed to be larger than the second through hole (217) size-wise, and in a case the screw body (510) is coupled to the recess (125) of the bobbin (150), the head unit (520) is brought into contact with the bottom surface of the first elastic members (210) opposite to the bottom case (420) to inhibit the first elastic members (210) from being disengaged from the bobbin (150).

As apparent from the foregoing, the VCM according to the present disclosure has an advantageous effect in that the bottom end of the bobbin is formed with a coupling boss and a recess, a first through hole is formed opposite to the coupling boss among the first elastic members coupled to the bottom end of the bobbin and inserted into the coupling boss, a second through hole is formed opposite to the recess among the first elastic members, a distal end of the coupling member is thermally fused, and the second coupling hole and the recess are filled with the reinforcement member to reinforce the coupling strength between the bobbin and the first elastic members, whereby the first elastic members are inhibited from being disengaged to increase the durability and to reduce the manufacturing cost.

Figure 18:
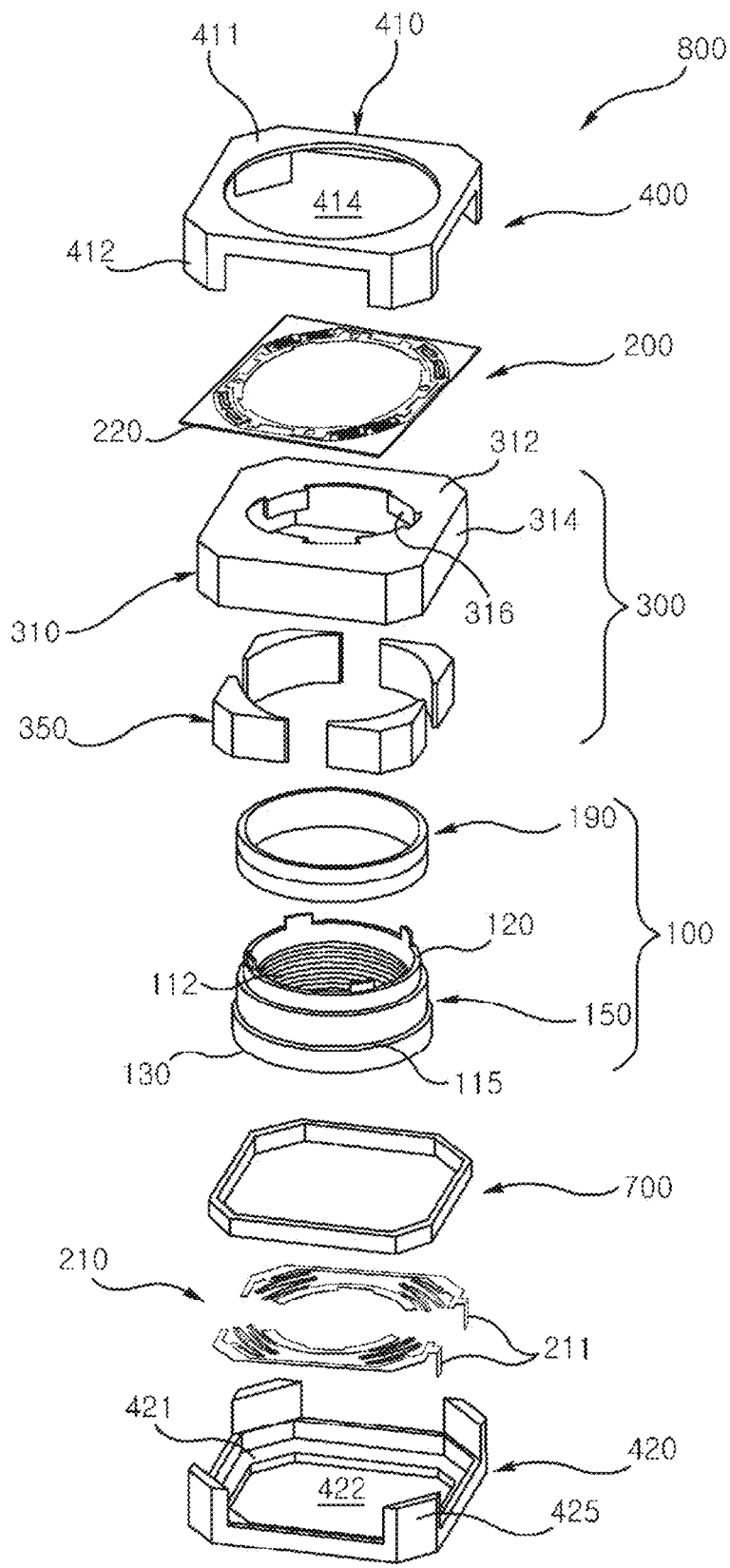
FIG. 18 is an exploded perspective view of a VCM according to an exemplary embodiment of the present disclosure.
Figure 19:
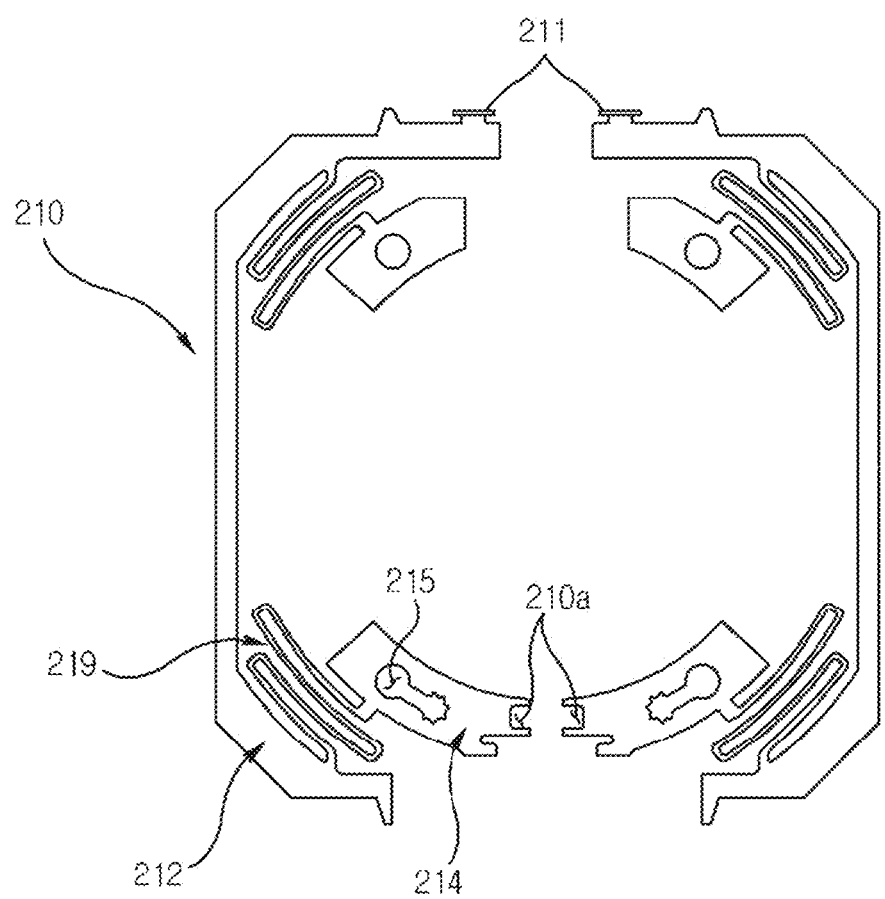
FIG. 19 is a plane view illustrating a first elastic member of FIG. 17.
Figure 20:
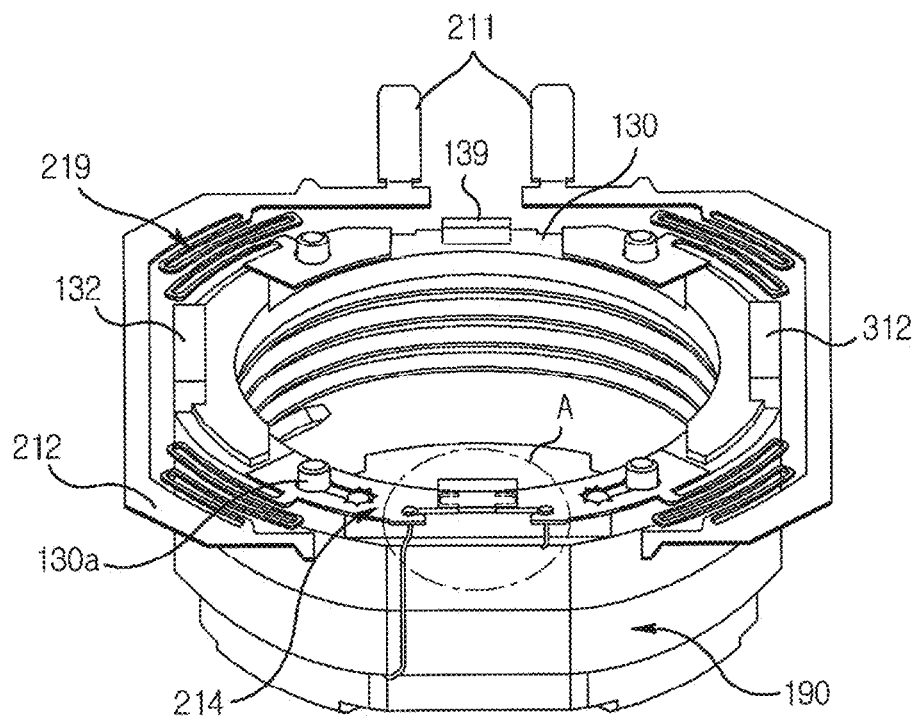
FIG. 20 is a rear perspective view illustrating the bobbin and the first elastic member of the elastic member of FIG. 17.
Figure 21:
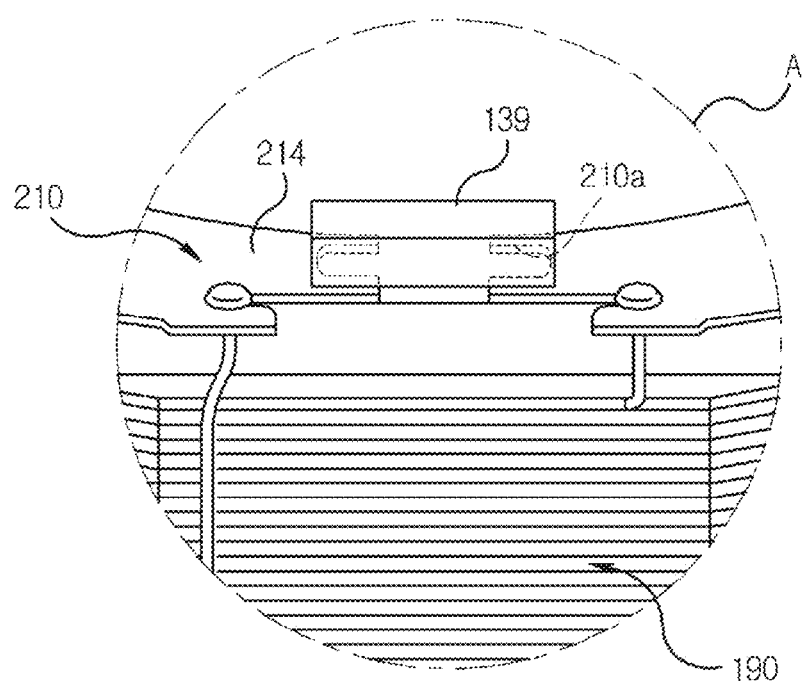
FIG. 21 is a partially enlarged view of 'A' of FIG. 20.

FIG. 18 is an exploded perspective view of a VCM according to an exemplary embodiment of the present disclosure, FIG. 19 is a plane view illustrating a first elastic member of FIG. 17, FIG. 20 is a rear perspective view illustrating the bobbin and the first elastic member of the elastic member of FIG. 17, and FIG. 21 is a partially enlarged view of 'A' of FIG. 20.

Referring to FIG. 18, a VCM (800) includes a rotor (100), an elastic member (200), and a stator (300). The VCM (800) may further include a spacer (700). Referring to FIGS. 18 and 19, the rotor (100) includes a bobbin (150) and a coil block (190).

The bobbin (150) may take the shape of a cylinder with both ends opened. The both ends-opened cylindrical bobbin (150) serves to accommodate and secure a lens. In the exemplary embodiment of the present disclosure, the bobbin (150) takes the shape of a cylinder with both ends opened, for example.

An inner surface of the bobbin (150) is formed with a female screw unit (112) for accommodating the lens, and the lens is secured by using the female screw (112). The lens may be secured to the female screw unit (112) of the bobbin (150) using the lens fixing member. Alternatively, it should be also appreciated that the lens is directly coupled to the female screw unit (112) of the bobbin body (110).

A peripheral bottom distal end of the bobbin body (110) is formed with a hitching sill (115) for supporting a coil block (190, described later).

Referring to FIG. 20, the bottom surface of the bobbin is symmetrically formed with bosses (132) based on the bobbin (150). The bosses (132) formed at the bottom surface (130) of the bobbin (150) serves to accommodate the bobbin (150) to a bottom case (or base, 420) of a case (400, described later).

The bosses (132) formed at the bottom surface (130) of the bobbin (150) may take the shape of a cuboid. Alternatively, the bosses (132) formed at the bottom surface (130) of the bobbin (150) may take various shapes other than the cuboid. Both sides of the boss (132) formed at the bottom surface (130) of the bobbin (150) may be formed with pillar-shaped coupling bosses (130a).

The coupling bosses (130a) are coupled to the first elastic member (210) of elastic member (200, described later) to serve to tightly contact the elastic member (200) to the bottom surface (130) of the bobbin (150). A distal end of the coupling boss (130a) is thermally fused by heat and pressure to tightly bring the first elastic member (210) to the bottom surface (130).

The bottom surface (130) of the bobbin (150) is additionally formed with a fusion unit (139) along with the coupling boss (130a). In the exemplary embodiment of the present disclosure, the fusion unit (139) may take the shape of a cuboidal pillar, for example. Alternatively, the fusion unit (139) may take various shapes including a circular cylinder, a square pillar, and a polygonal pillar other than the cuboidal pillar.

The fusion unit (139) formed on the bottom surface (130) of the bobbin (150) is formed at a center of an adjacent pair of bosses (132) of the bobbin (150). The fusion unit (139) is arranged at a position corresponding to that of a distal end opposite to the pair of first elastic members (200, described later). The fusion unit (139) serves to tightly bring the distal end of the first elastic members (210) of the elastic member (200) to the bottom surface (130) of the bobbin (150).

In the exemplary embodiment of the present disclosure, the fusion unit (139) is lower than the boss (132) of the bobbin (150) when the height of the fusion unit (139) is measured from the bottom surface (130) of the bobbin (150).

If the fusion unit (139) is higher than the boss (132) of the bobbin (150), the fusion unit (139) may be brought into contact with the bottom case (420) before the boss (132) of the bobbin (150) to incline the bobbin (150) when the bobbin (150) is accommodated into the case (400).

The coil block (190) is wound on the periphery of the bobbin (150), and is secured to the hitching sill (115) formed on the bottom peripheral surface of the bobbin (150). The coil block (190) may be secured to the hitching sill (115) of the bobbin (150) and/or to the periphery of the bobbin (150) using an adhesive. The coil block (190) may be bonded to the periphery of the bobbin (150) using an adhesive, for example. Alternatively, it should be apparent that the cylindrically wound coil block (190) is inserted into the periphery of the bobbin (150), and coupled to the bobbin (150) using an adhesive.

As a driving signal is applied to the coil block (190) arranged on the periphery of the bobbin (150), a magnetic field is generated, and the bobbin (150) is driven by the magnetic field generated by the coil block (190) and the magnetic field generated by the magnet (350) of the stator (300)

Referring to FIGS. 18 and 19, the elastic member (200) includes a first elastic member (210) and a second elastic member (220). The first elastic member (210) is coupled to the bottom surface (130) of the bobbin (150) to elastically support the bobbin (150).

In the exemplary embodiment of the present disclosure, the first elastic member (210) is formed in a pair and each of the first elastic members (210) is coupled to the bottom surface (130) of the bobbin (150), where one of the pair of first elastic members (210) is electrically insulated from the other.

Each of the pair of first elastic members (210) is formed with a connection terminal (211) to which a driving signal is applied from outside. Each of the pair of first elastic members (210) includes an outer elastic unit (212), an inner elastic unit (214) and a connection elastic unit (219).

The outer elastic unit (212) and the inner elastic unit (214) are connected by the connection elastic unit (219), and each of the pair of first elastic members (210) elastically supports the bobbin (150) using the elastic force of the connection elastic unit (219).

The outer elastic unit (212) is secured by the bottom case (420) of the case (400, described later) and the spacer (700), and the inner elastic unit (214) is secured to the bottom surface (130) of the bobbin (150). The outer elastic unit (212) is formed with the connection terminal (211) electrically connected to an outside circuit board.

The inner elastic unit (214) is soldered to a distal end of the coil forming the coil block (190) using a solder. The inner elastic unit (214) is formed with a clip unit for being coupled to the coil of the coil block (190). The inner elastic unit (214) is formed in a shape of a curved plate having a substantially same curvature as that of the bottom surface (130) of the bobbin (150). Thus, a driving signal applied to the connection terminal (211) from outside is applied to the coil block (190) sequentially through the outer elastic unit (212), the inner elastic unit (214) and the connection elastic unit (219), whereby a magnetic field is generated from the coil block (190).

The inner elastic unit (214) includes a through hole (215), which is formed at a place coupled to the coupling boss (130a) formed at the bottom surface (130) of the bobbin (150) illustrated in FIG. 3.

As the pair of first elastic members (210) is arranged along the bottom surface (130) of the bobbin (150), each distal end of inner elastic units of the pair of first elastic members (210) faces the other distal end when viewed in a top plan view. Each distal end of inner elastic units of the pair of first elastic members (210) is arranged across the fusion unit (139), and each distal end of the inner elastic units (214) is secured by the fusion unit (139).

In a case each distal end of the inner elastic units (214) is secured by the fusion unit (139), the distal ends of the inner elastic units (214) are distanced from the bobbin (150) to inhibit the coil of the coil block (19) from being short-circuited by the inner elastic unit (214), even if the VCM (800) is applied with a strong shock or vibration.

Referring to FIGS. 20 and 21, each distal end facing the inner elastic unit (214) of the first elastic members (210) may be formed with a concave coupling groove (210a) in order to secure, by the fusion unit (139), the distal ends facing the first elastic members (210) to the bottom surface (130) of the bobbin (150).

The concave coupling groove (210a) formed at each distal end facing the inner elastic unit (214) of the first elastic members (210) takes the shape of a groove or an opening inserted to the surface of the fusion unit (139).

In a case the fusion unit takes the shape of a cuboidal pillar, for example, the coupling groove (210a) may take the shape of encompassing three lateral surfaces of the fusion unit (139), and the inner elastic unit (214) of the first elastic members (210) may be securely coupled to the bottom surface (130) of the bobbin (150) by the coupling groove (210a).

Although the exemplary embodiment of the present disclosure has explained and illustrated the fusion unit formed at the bobbin (150), and fusion of the first elastic members (210) using the fusion unit, the configuration is not limited thereto. For example, the distal ends facing the first elastic members (210) may be directly fused to the bottom surface (130) of the bobbin (150) in order to inhibit the coil of the coil block (190) from being short-circuited.

Referring to FIG. 18 again, the second elastic member (220) of the elastic member (200) is secured to a yoke (310, described later), and is elastically secured to an upper surface (120) facing the bottom surface (130) of the bobbin (150).

The stator (300) includes a yoke (310) and a magnet (350). The yoke (310) includes a yoke upper plate (312), a yoke lateral plate (314) and a back yoke (316). In the exemplary embodiment of the present disclosure, the yoke (310) serves to enhance a driving efficiency of the rotor (100) in order to inhibit the magnetic field generated by the magnet (350, described later) from leaking.

The yoke upper plate (314) takes the shape of a rectangular plate, and is centrally formed with an opening for exposing a bobbin or a lens. The yoke lateral plate (314) is extended from each edge to a direction encompassing the bobbin (150). The back yoke (316) is extended from an inner lateral surface of the yoke upper plate (312) to face each corner of the yoke lateral plate (314).

The magnet (350) is arranged at a place opposite to each corner of the yoke lateral plate (314), and is arranged at a place opposite to the coil block (190) arranged on the periphery of the bobbin (150). The magnet (350) may be bonded to the yoke lateral plate (314) using an adhesive, for example.

The bobbin (150) is moved upwards by a force generated by magnetic field generated by each of the magnets (350) and a magnetic field generated by the coil block (190), and the bobbin (150) is elastically supported by first and second elastic members (210, 220). At this time, a moved distance of the bobbin (150) can be accurately adjusted by a current applied to the coil block (190).

A case (400) includes an upper case (410) and a bottom case (420). The case (400) serves to mutually couple and secure the rotor (100), the elastic member (200) and the stator (300). The upper case (410) includes an upper plate (411) and a coupling pillar (412). The upper case (410) is arranged on an upper surface of the yoke (310), and the second elastic member (220, described later) in the elastic member (200) is interposed between the upper case (410) and the yoke (310).

The upper plate (411) of the upper case (410) takes the shape of a square plate when viewed from a top plan view, and is centrally formed with a circular opening (414) for exposing the bobbin (150).

The coupling pillar (412) of the upper case (410) is protruded in parallel with the bobbin (150) from four corners of the upper plate (411), and is coupled to the bottom case (420, described later). The bottom case (420) includes pillars (425) coupled to each coupling pillar (412) of the upper case (410).

As apparent from the foregoing, a distal end of leaf spring elastically supporting the bobbin is securely coupled to the bobbin using thermal fusion method to inhibit the coil of the coil block from being short-circuited from the leaf spring even if the VCM is applied with a strong shock or vibration.

Figure 22:
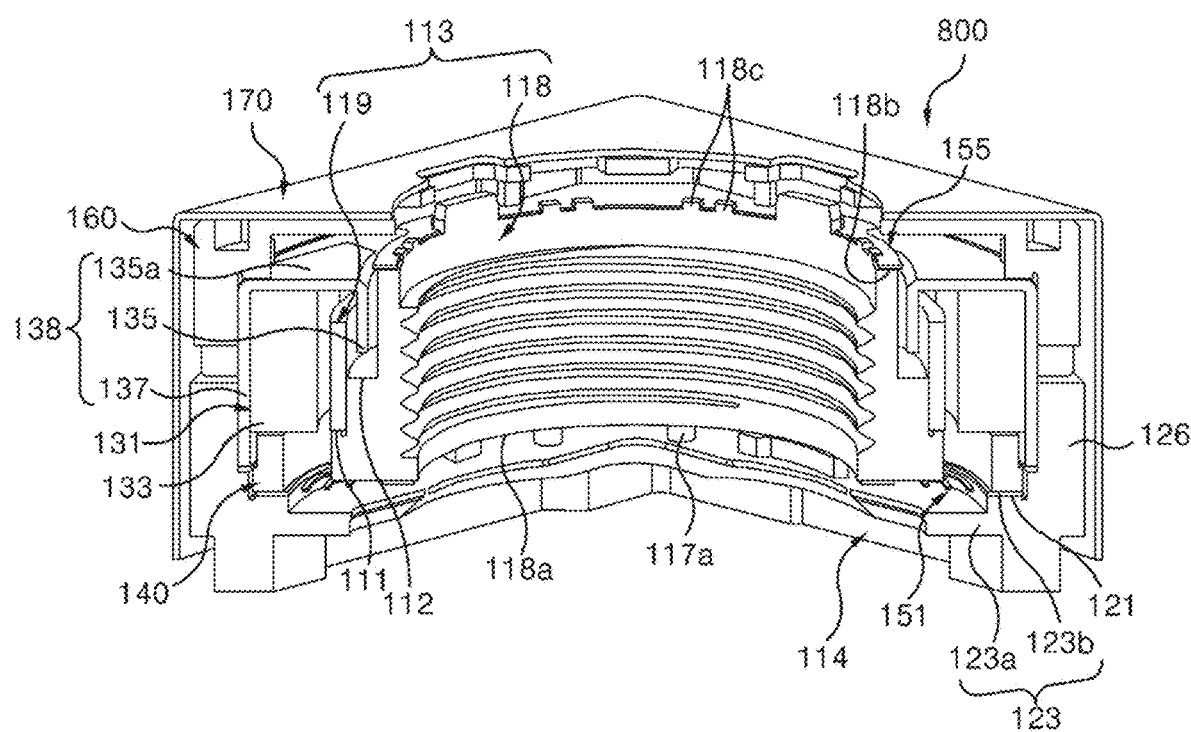
FIG. 22 is a partially cut-out perspective view of a VCM according to an exemplary embodiment of the present disclosure.
Figure 23:
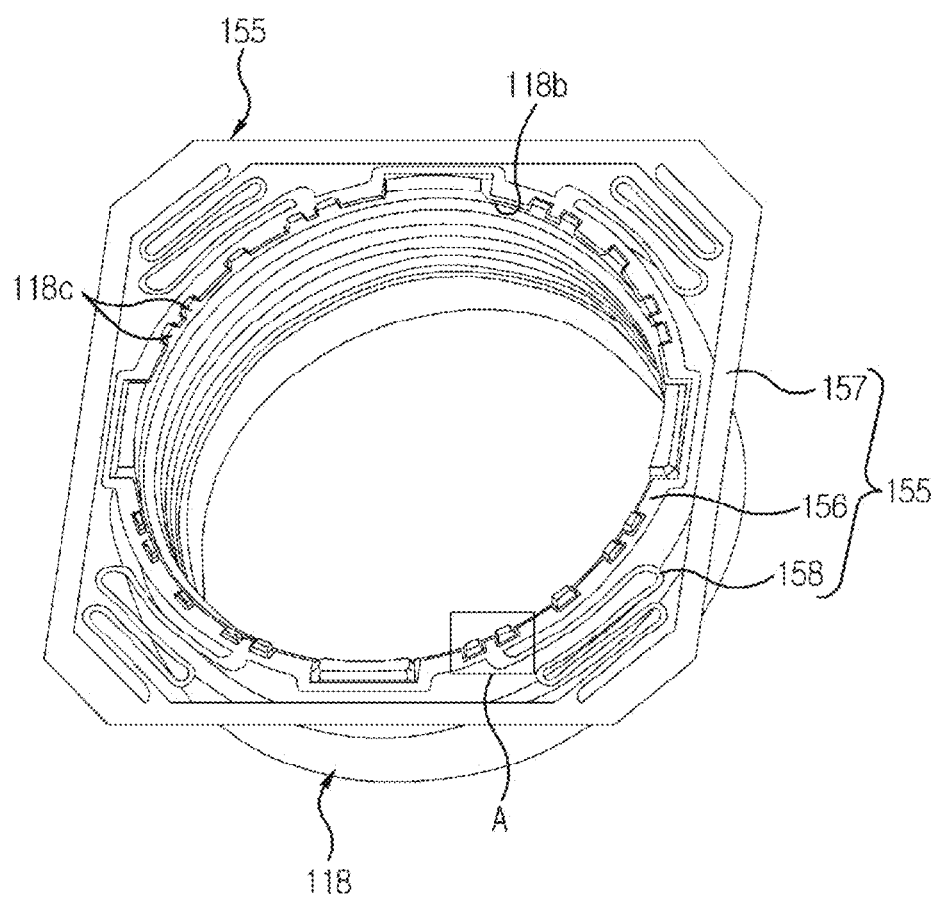
FIG. 23 is a perspective view illustrating the bobbin and elastic member of FIG. 22.
Figure 24:
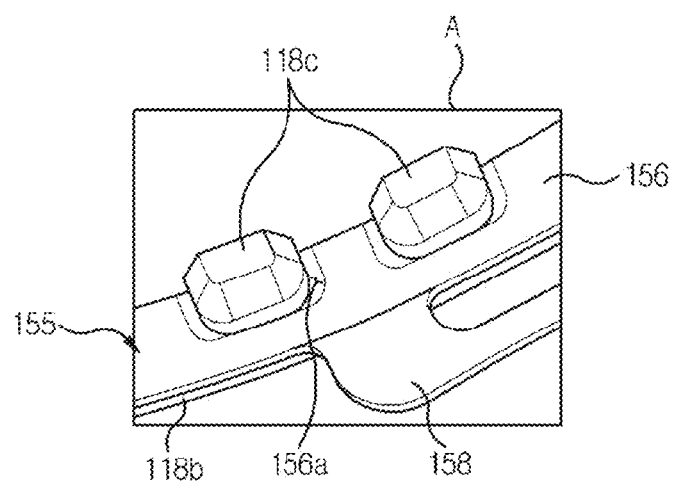
FIG. 24 is a partially enlarged view of 'A' of FIG. 22.
Figure 25:
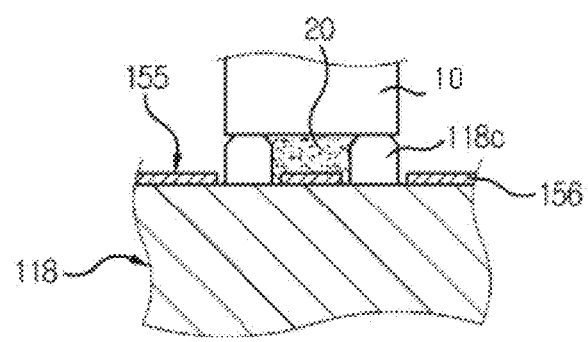
FIG. 25 is a cross-sectional view illustrating a process in which a bobbin and an elastic member are bonded.

FIG. 22 is a partially cut-out perspective view of a VCM according to an exemplary embodiment of the present disclosure, FIG. 23 is a perspective view illustrating the bobbin and elastic member of FIG. 22, FIG. 24 is a partially enlarged view of 'A' of FIG. 22, and FIG. 25 is a cross-sectional view illustrating a process in which a bobbin and an elastic member are bonded.

Referring to FIGS. 22 through 25, the VCM (800) may include a rotor (113), a base (114), a stator (131), a spacer (140) and elastic members (151, 155). The VCM may further include an upper spacer (160) and a cover can (170).

The rotor (113) may include a bobbin (118) coupled by a lens (not shown) and a coil (119). The rotor (113) serves to adjust a gap between an image sensor module arranged at the rear surface of the base (114) and the lens coupled to the bobbin (118).

The bobbin (118) may take the shape of cylinder, for example, and is formed with an inner lateral surface for adequately coupling a disk-shaped lens. The inner lateral surface of the bobbin (118) is formed with a screw unit for coupling the lens.

The bobbin (118) is externally formed with two hitching sills (111, 111a), and the hitching sill (111) formed at the bottom surface is arranged with a coil, and the hitching sill (111a) formed on the upper surface is arranged thereon with a part of the yoke of the stator (130, described later).

A bottom surface (118a) opposite to the base (114) in the bobbin (118) is formed with a plurality of lugs (117a). The lugs (117a) serve as coupling members that are coupled to the elastic member (151, described later), and the bottom surface (118a) of the bobbin (118) and an upper surface of the base (114) are distanced at a predetermined gap by the lugs (117a).

An upper surface (118b) of the bobbin (118) facing the bottom surface (118a) of the bobbin (118) is formed with adhesive guide lugs (118c). The adhesive guide lugs (118c) are formed in a pair, and each adhesive guide lug is adjacently arranged to the other lug, and is adjacently arranged to an inner lateral surface of the bobbin (118) in the upper surface (118b) of the bobbin (118).

The pair of adhesive guide lugs (118c) is intermittently arranged along the upper surface (118b) of the bobbin (118), and may be formed at an equidistant gap.

The coil (119) formed by a wire coated with insulation resin such as enamel resin is wound on the periphery of the bobbin (118) in a cylindrical shape. Alternatively, the cylindrically wound coil (119) may be secured to the periphery of the bobbin (118) using an adhesive. A bottom end of the coil (119) is arranged on the hitching sill (111).

An upper end of the cylindrically formed coil (119) is arranged on a place higher than the hitching sill (111a), whereby a space is formed between the coil (119) and the periphery of the bobbin (118).

The base (114) may include a floor plate (124) and a lateral plate (126). The floor plate (124) takes the shape of a square plate when viewed from a top plan view, and is formed with a hitching sill (121). The floor plate (124) is divided into a bottom floor plate (124a) and an upper floor plate (124b) by the hitching sill (121).

The bottom floor plate (124a) is arranged thereon with lugs (117a) of the bobbin (118), and the upper floor plate (124b) is arranged thereon with a spacer (140). The lateral plate (126) is formed along edges of the floor plate (124), and is substantially vertical to the floor plate (124).

The stator (131) is arranged opposite to the coil (119) of the rotor (113), and serves to vertically move the rotor (113). The stator (131) includes a magnet (133) and a yoke (138).

A plurality of magnets (132) may be arranged about the coil (119), each at an equidistant gap. A magnetic field generated by the magnet (133) and a magnetic field generated by the coil (119) generate attractive force and repulsive force, and the rotor (113) is vertically moved relative to the stator (131) by the attractive force and repulsive force.

The yoke (138) includes an outer yoke unit (137), an inner yoke unit (135) and a connection yoke unit (135a). In the exemplary embodiment of the present disclosure, the yoke (138) includes a metal plate. The yoke (138) inhibits or restrains a magnetic field generated by the magnet (133) and a magnetic field generated by the coil (119) from leaking, whereby a driving efficiency of the rotor (113) can be enhanced.

The outer yoke unit (137) includes four plates formed in parallel with the periphery of the bobbin (118), for example. The inner yoke unit (135) is arranged at a place corresponding to that of each magnet (133). The connection yoke unit (135a) functions to mutually connect the outer yoke unit (137) and the inner yoke unit (135).

The magnet (133) is accommodated into the yoke (138), and may be bonded to an interior of the yoke (138) using an adhesive. The spacer (140) is interposed between the magnet (133) and the upper floor plate (124b) of the floor plate (124) of the base (114) to secure the magnet (133) at a predetermined position.

An upper spacer (160) depresses the yoke (138) to place the yoke (138) at a predetermined position. The upper spacer (160) takes the shape of a square, and depresses the connection yoke unit (135a) of the yoke (138) to secure the magnet (133) on the spacer (140).

The elastic members (151, 155) elastically support the rotor (113). Hereinafter, the elastic members (151, 155) are defined as a first elastic member (151) and a second elastic member (155).

The first elastic member (151) including two elastic members is arranged along the bottom surface (118a) of the bobbin (118), and each of the two first elastic members (151) is electrically connected therebetween. The first elastic member (151) includes an inner elastic unit, an outer elastic unit and a connection elastic unit.

The inner elastic unit takes the shape of a semi-circular ring, and is coupled to the lug (117a) formed at the bottom surface of the bobbin (118).

The outer elastic unit takes the shape of a semi-circular ring, and is interposed between the upper floor plate (124b) of the floor plate (124) at the base (114) and the spacer (140). The connection elastic unit elastically connects the inner elastic unit and the outer elastic unit. In the exemplary embodiment of the present disclosure, the inner elastic unit, the outer elastic unit and the connection elastic unit are integrally formed.

Referring to FIGS. 23 and 24, the second elastic member (155) is arranged on the upper surface (118b) which is a distal end facing the bottom surface (118a) of the bobbin (118). The second elastic member (155) includes an inner elastic unit (156), an outer elastic unit (157) and a connection elastic unit (158).

The inner elastic unit (156) takes the shape of a round ring arranged along the upper surface (118b) of the bobbin (118), and the outer elastic unit (157) takes the shape of a round ring having a greater diameter than that of the inner elastic unit (156). The connection elastic unit (158) elastically connects the inner elastic unit (156) and the outer elastic unit (157), and the rotor (113) including the bobbin (118) is elastically supported to the stator (131) by the outer elastic unit (157).

The outer elastic unit (157) is interposed between the upper spacer (160) and the yoke (138) and secured by the upper spacer (160) and the yoke (138). The inner elastic unit (156) is arranged at a place opposite to the upper surface (118b) of the bobbin (118).

The connection elastic unit (158) elastically connects the inner and outer elastic units (156, 157) at four areas, for example, and adhesive guide lugs (118c) formed at the upper surface (118b) of the bobbin (118) are formed at areas where the connection elastic unit (158) and the inner elastic unit (156) are mutually connected.

In a case the adhesive guide lugs (118c) are formed at areas where the connection elastic unit (158) and the inner elastic unit (156) are mutually connected, the adhesive strength of the adhesive at the areas where the connection elastic unit (158) and the inner elastic unit (156) are mutually connected can be further enhanced.

Referring to FIGS. 23 and 24 again, the ring-shaped inner elastic unit (156) is formed with an opening (156a) formed at a place corresponding to that of the adhesive guide lugs (118c) formed at the upper surface (118b) of the bobbin (118). The adhesive guide lugs (118c) are inserted into the opening (156a) formed at the inner elastic unit (156). Meanwhile, a part of the inner elastic unit (156) is extended to a space formed by the adhesive guide lugs (118c).

The opening (156a) formed at the inner elastic unit (156) takes a shape formed from an inner lateral surface of the inner elastic unit (156) to a direction facing the periphery of the inner elastic unit (156). That is, the opening (156a) formed at the inner elastic unit (156) may take the shape of the inner elastic unit (156) having an inner lateral surface opened. Alternatively, the opening (156a) formed at the inner elastic unit (156) may take the shape of a hole that is closed.

In the exemplary embodiment of the present disclosure, an area of the opening (156a) formed at the inner elastic unit (156) is formed to be larger than that of each of the adhesive guide lugs (118c), whereby a gap is formed between a lateral surface of the adhesive guide lug (118c) and the lateral surface formed by the opening (156a) of the inner elastic unit (156). The adhesive is provided between the inner elastic unit (156) and the upper surface (118b) of the bobbin (118) through the gap.

FIG. 25 is a cross-sectional view illustrating the bobbin, the second elastic member and a dispenser providing the adhesive of FIG. 24.

Referring to FIGS. 24 and 25, the bobbin (118) and the inner elastic unit (156) are mutually assembled by insertion of the opening formed at the inner elastic unit (156) of the second elastic member (155) into the adhesive guide lugs (118c) formed at the upper surface (118b) of the bobbin (118). Successively, the dispenser (10) provides an adhesive (20) to between the adhesive guide lugs (118c) formed in a pair, and the adhesive (20) is provided to between the upper surface (118b) of the bobbin (118) and the inner elastic unit (156) through the gap formed between the opening (156a) of the inner elastic unit (156) and the adhesive guide lugs (118c).

In a case the dispenser (10) provides a predetermined amount of adhesive to between the adhesive guide lugs (118c) and is distanced from the adhesive guide lug (118c), the adhesive (20) is in a state of being filled between both lateral walls facing the adhesive guide lug (118c), such that the inner elastic unit (156) is not distanced along the dispenser (10) even if the dispenser (10) is distanced from the adhesive guide lug (118c), whereby the inner elastic unit (156) of the second elastic member (155) can be inhibited from being deformed or damaged.

Although the exemplary embodiment of the present disclosure has explained and illustrated that the upper surface (118b) of the bobbin (118) and the second elastic member (155) are mutually adhered by using the adhesive guide lugs (118c), the configuration is not limited thereto. For example, the upper surface (118b) of the bobbin (118) and the first elastic member (151) may be mutually adhered by using the adhesive guide lugs.

As apparent from the foregoing, the VCM according to the present disclosure has an advantageous effect and industrial applicability in that adhesive guide lugs are formed at the bobbin coupled to the elastic member to inhibit the elastic member from being deformed and/or damaged.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

The invention claimed is:

1. A voice coil motor comprising:
   a base;
   a bobbin disposed above the base;
   a coil disposed on the bobbin;
   a magnet facing the coil;
   a first elastic member coupled to a lower surface of the bobbin; and
   an adhesive member coupling the bobbin and the first elastic member;
   wherein the first elastic member comprises an inner elastic unit coupled to the lower surface of the bobbin, an outer elastic unit disposed outside the inner elastic unit, and a connection elastic unit connecting the inner elastic unit and the outer elastic unit,
   wherein the inner elastic unit of the first elastic member comprises a first hole and a second hole,
   wherein the bobbin comprises a boss protruded from the lower surface of the bobbin,
   wherein the boss is inserted into the first hole and fused to couple the inner elastic unit and the bobbin, and
   wherein the adhesive member is disposed on the second hole to couple the inner elastic unit and the bobbin.

2. The voice coil motor of claim 1, wherein the boss is thermally fused.

3. The voice coil motor of claim 1, wherein each of the first hole and the second hole has a circular shape, and
   wherein a diameter of the first hole is larger than a diameter of the second hole.

4. The voice coil motor of claim 1, wherein the first hole comprises a plurality of first holes spaced apart from each other,
   wherein the second hole comprises a plurality of second holes spaced apart from each other, and
   wherein one of the plurality of first holes is formed closer to one of the plurality of second holes than it is to the remaining first holes.

5. The voice coil motor of claim 3, wherein the boss comprises a plurality of bosses, and
   wherein the plurality of bosses are spaced apart from the plurality of second holes.

6. The voice coil motor of claim 3, wherein the boss comprises a disengagement prevention unit covering a portion of a surface of the inner elastic unit.

7. The voice coil motor of claim 1, wherein a lower surface of the bobbin has a groove formed at a position corresponding to the second hole.

8. The voice coil motor of claim 7, wherein the adhesive member is disposed between the groove of the bobbin and the second hole.

9. The voice coil motor of claim 1, wherein the first elastic member comprises two elastic units spaced apart from each other, and
   wherein the coil is coupled to the two elastic units by a solder.

10. The voice coil motor of claim 2, wherein the adhesive member is a thermally curable adhesive or an ultraviolet curing adhesive.

11. A camera module comprising:
    an image sensor;
    the voice coil motor of claim 1; and
    a lens coupled to the bobbin of the voice coil motor.

12. A mobile phone comprising the camera module of claim 11.

13. A voice coil motor comprising:
    a base;
    a bobbin disposed above the base;
    a coil disposed on the bobbin;
    a magnet facing the coil;
    a lower elastic member coupled to a lower surface of the bobbin; and an adhesive member coupling the bobbin and the lower elastic member;

wherein the lower elastic member comprises a first elastic unit and a second elastic unit, wherein the first elastic unit comprises a first inner elastic unit coupled to the bobbin, a first outer elastic unit disposed outside the first inner elastic unit, and a first connection unit connecting the first inner elastic unit and the first outer elastic unit, wherein the second elastic unit comprises a second inner elastic unit coupled to the bobbin, a second outer elastic unit disposed outside the second inner elastic unit, and a second connection unit connecting the second inner elastic unit and the second outer elastic unit, wherein the first inner elastic unit comprises a first hole and a second hole, wherein the second inner elastic unit comprises a third hole and a fourth hole, wherein the bobbin comprises a first boss and a second boss protruded from one surface of the bobbin, wherein the first boss is inserted into the first hole and fused to couple the first inner elastic unit and the bobbin, wherein the second boss is inserted into the third hole and fused to couple the second inner elastic unit and the bobbin, wherein the adhesive member comprises a first adhesive member and a second adhesive member, wherein the first adhesive member is disposed on the second hole to couple the first inner elastic unit and the bobbin, and wherein the second adhesive member is disposed on the fourth hole to couple the second inner elastic unit and the bobbin.

14. The voice coil motor of claim 13, wherein each of the first hole and the second hole has a circular shape, and
where a diameter of the first hole is larger than a diameter of the second hole.

15. The voice coil motor of claim 13, wherein each of the third hole and the fourth hole has a circular shape, and
where a diameter of the third hole is larger than a diameter of the fourth hole.

16. The voice coil motor of claim 13, wherein the bobbin comprises a third boss and a fourth boss protruded from the lower surface of the bobbin, wherein the first inner elastic unit comprises a fifth hole and a sixth hole, wherein the second inner elastic unit comprises a seventh hole and an eighth hole, wherein the third boss is inserted into the fifth hole and thermally fused to couple the first inner elastic unit and the bobbin, wherein the fourth boss is inserted into the seventh hole and thermally fused to couple the second inner elastic unit and the bobbin, wherein the adhesive member comprises a third adhesive member and a fourth adhesive member, wherein the third adhesive member is disposed in the sixth hole to couple the first inner elastic unit and the bobbin, and wherein the fourth adhesive member is disposed in the eighth hole to couple the second inner elastic unit and the bobbin.

17. The voice coil motor of claim 16, wherein a distance between the first hole and the fifth hole is different from a distance between the second hole and the sixth hole.

18. The voice coil motor of claim 16, wherein the lower surface of the bobbin has a groove formed at a position corresponding to the second hole.

19. The voice coil motor of claim 16, wherein each of the first boss, the second boss, the third boss, and the fourth boss is thermally fused, and
wherein the adhesive member is a thermally curable adhesive or an ultraviolet curing adhesive.

20. A voice coil motor comprising:
a base;
a bobbin disposed above the base;
a coil disposed on the bobbin;
a magnet facing the coil;
a first elastic member coupled to a lower surface of the bobbin; and
an adhesive member coupling the bobbin and the first elastic member.

\* \* \* \* \*